United States Patent
Yajnik et al.

(10) Patent No.: US 7,376,092 B2
(45) Date of Patent: May 20, 2008

(54) METHOD AND APPARATUS FOR IMPLEMENTING PERSISTENT AND RELIABLE MESSAGE DELIVERY

(75) Inventors: Shalini Yajnik, Berkeley Heights, NJ (US); Chung-Yih Wang, Piscataway, NJ (US); Chih-mei Lin, Parsippany, NJ (US); Tsu-Wei Chen, Berkeley Heights, NJ (US); Yennun Huang, Bridgewater, NJ (US)

(73) Assignee: Precache Inc., Bridgewater, NJ (US)

( * ) Notice: Subject to any disclaimer, the term of this patent is extended or adjusted under 35 U.S.C. 154(b) by 958 days.

(21) Appl. No.: 10/400,462

(22) Filed: Mar. 28, 2003

(65) Prior Publication Data

US 2003/0189946 A1    Oct. 9, 2003

Related U.S. Application Data

(63) Continuation-in-part of application No. 10/199,439, filed on Jul. 19, 2002, now Pat. No. 7,117,270, and a continuation-in-part of application No. 10/199,388, filed on Jul. 19, 2002, and a continuation-in-part of application No. 10/199,369, filed on Jul. 19, 2002, now Pat. No. 6,910,033, and a continuation-in-part of application No. 10/199,368, filed on Jul. 19, 2002, and a continuation-in-part of application No. 10/199,356, filed on Jul. 19, 2002.

(60) Provisional application No. 60/447,782, filed on Feb. 19, 2003, provisional application No. 60/369,832, filed on Apr. 3, 2002.

(51) Int. Cl.
    *G06F 15/16*    (2006.01)

(52) U.S. Cl. .................. 370/270; 370/401; 709/202
(58) Field of Classification Search ................ 370/270, 370/401
    See application file for complete search history.

(56) References Cited

U.S. PATENT DOCUMENTS

| | | | | |
|---|---|---|---|---|
| 5,988,847 A * | 11/1999 | McLaughlin et al. | ........... | 700/9 |
| 6,212,568 B1 * | 4/2001 | Miller et al. | ................. | 709/236 |
| 6,298,455 B1 * | 10/2001 | Knapman et al. | ............. | 714/43 |
| 6,591,288 B1 * | 7/2003 | Edwards et al. | ............ | 709/203 |
| 6,598,116 B1 * | 7/2003 | Aho et al. | .................. | 711/105 |
| 6,643,682 B1 * | 11/2003 | Todd et al. | ................. | 709/202 |
| 6,907,501 B2 * | 6/2005 | Tariq et al. | ................. | 711/118 |

OTHER PUBLICATIONS

Gupta, P., et al., Algorithms for Packet Classification. IEEE Network, pp. 24-32, Mar./Apr. 2001.

Srinivasan, V., et al., Fast and Scalable Layer Four Switching. In Proceedings of SIGCOMM '98, pp. 191-202, 1998.

(Continued)

*Primary Examiner*—Edan Orgad
*Assistant Examiner*—Jay P. Patel
(74) *Attorney, Agent, or Firm*—Andrews Kurth LLP

(57) ABSTRACT

A method and apparatus provide for persistent caching of methods delivered via a publish-subscribe network. At a first node, a message having data via the network is received. The data is time-marked. The data is cached in a cache memory at the first node. The message is routed to a second node using content-based routing. These steps are repeated at a second node. A router that includes modules for executing this method is provided. A publish-subscribe network that includes nodes that include modules for executing this method is provided. A computer-readable medium that includes instructions for executing this method is provided.

18 Claims, 24 Drawing Sheets

OTHER PUBLICATIONS

Gupta et al., Packet Classification on Multiple Fields, Proceedings of ACM SIGCOMM '99, pp. 147-160, Aug. 1999.

Lakshman, T., et al., High Speed Policy-based Packet Forwarding Using Efficient Multi-dimensional Range Matching. In Proc. ACM SIGCOMM '98, pp. 203-214, 1998.

Srinivasan, V., et al., Packet Classification using Tuple Space Search. In Proceedings of ACM SIGCOMM '99, pp. 135-146, Sep. 1999.

Adiseshu,,H., et al., Packet filter management for layer 4 switching. In Proceedings of IEEE INFOCOM, 1999.

Buddhikot, M., et al., Space decomposition for fast layer-4 switching. In Proceedings of IFIP Workshop on Protocols for High Speed Networks, Salem, Massachusetts, pp. 25-41, Aug. 25-28, 1999.

Gupta et al., Packet Classification Using Hierachical Intellignet Cuttings. In Proceedings Hot Interconnects VII, Aug. 1999.

Warkhede, P.R., et al., Fast Packet Classification for Two-Dimensional Conflict-Free Filters. In Proc. INFOCOM, pp. 1434-1443, 2001.

Waldvogel, M., Multi-Dimensional Prefix Matching Using Line Search. In Proceedings of IEEE Local Computer Networks, pp. 200-207, Nov. 2000.

Eppstein, D., et al., Internet packet filter management and rectangle geometry. In Proceedings of the $12^{th}$ Annual ACM-13 SIAM Symposium on Discrete Algorithms (SODA 2001), pp. 827-835, Washington, DC., Jan. 2001.

Feldman, A., Tradeoffs for packet classification. In Proc. INFOCOM, vol. 3, pp. 1193-1202. IEEE, Mar. 2000.

Woo, T., A Modular Approach to Packet Classification: Algorithms and results. In Proc. IEEE INFOCOM, Tel-Aviv, Israel, pp. 1213-1222, Mar. 2000.

Eugster, P., et al., Event Systems, How to Have Your Cake and Eat It Too, In $22^{nd}$ International Conference on Distributed Computing Systems Workshops (ICDCSW '02), Vienna, Austria, Jul. 02-05, 2002.

* cited by examiner

| 386 | | 388 | |
|---|---|---|---|
| 72 | | Bytes in message | |
| 2 | | Channel ID (assumed) | |
| 3001 | | Publisher ID (assumed) | |
| 9509384 | | Publisher Session ID (assumed) | |
| 39 | | Sequence number (assumed) | |
| 0 | 2 | unused | Number of subject fields |
| 0 | 50 | Subject ID for # | Subject ID for SUBSCRIPTION |
| 5688 | 0 | Port number (assumed) | Subscription ID (assumed) |
| 1 | 4 | Number of subject filter fields | Number of attribute tests |
| 5 | 0 | Subject ID for > | padding to 4 bytes |
| 0 0000000 00110 001 | 1 0000001 01100 011 | Encoding of price >= | Encoding of and symbol == |
| 0 0000000 00110 001 | 1 0000010 01100 010 | Encoding of price >= | Encoding of and volume between |
| 10 | | Operand of price >= | |
| 2 | | Size of operand of symbol == | |
| L | U | Operand of symbol == (2 characters + 2 bytes padding) | |
| NUL | NUL | | |
| 10 | | Operand of price >= | |
| 1000 | | First operand of volume between | |
| 10000 | | Second operand of volume between | |

*FIG. 18*

METHOD AND APPARATUS FOR IMPLEMENTING PERSISTENT AND RELIABLE MESSAGE DELIVERY

REFERENCE TO RELATED APPLICATIONS

The present application incorporates by reference and claims the priority of U.S. Provisional Application No. 60/369,832, entitled "Method and Apparatus for Implementing Persistent and Reliable Message Delivery," filed Apr. 3, 2002, and U.S. Provisional Application No. 60/447,782, entitled "Propagating Content Filters, Content-Based Packet Routing Using Compact Filter Storage and Off-Line Precomputation, Reliable Publishing and Subscribing, Implementing Persistent and Reliable Message Delivery, and Implementing Query-Response Interactions By Mapping Data Advertisements as Subscriptions and Queries as Notifications in a Publish-Subscribe Network," filed Feb. 19, 2003. The present application is also a Continuation-in-Part (CIP) of U.S. patent application Ser. No. 10/199,356, entitled "Packet Routing Via Payload Inspection," U.S. patent application Ser. No. 10/199,368, entitled "Method And Apparatus For Content-Based Routing And Filtering At Routers Using Channels," U.S. patent application Ser. No. 10/199,439 now U.S. Pat. No. 7,117,270, entitled "Method For Sending And Receiving A Boolean Function Over A Network", U.S. patent application Ser. No. 10/199,369 now U.S. Pat. No. 6,910,033, entitled "Method For Storing Boolean Functions To Enable Evaluation, Modification, Reuse, And Delivery Over A Network," and U.S. patent application Ser. No. 10/199,388, entitled "Efficient Implementation of Wildcard Matching On Variable-Sized Fields In Connect-Based Routing," all filed Jul. 19, 2002 and all hereby incorporated by reference.

The present application also incorporates by reference the following U.S. patent applications, also CIPs of the above-referenced applications, filed herewith: application Ser. No. 10/400,671, entitled "Method and Apparatus for Reliable Publishing and Subscribing in an Unreliable Network," application Ser. No. 10/400,444, entitled "Method and Apparatus for Propagating Content Filters For a Publish-Subscribe Network," application Ser. No. 10/400,465, entitled "Method and Apparatus for Content-Based Packet Routing Using Compact Filter Storage and Off-Line Precomputation," and, application Ser. No. 10/400,453, entitled "Method and Apparatus for Implementing Query-Response Interactions in a Publish-Subscribe Network."

BACKGROUND OF THE INVENTION

Network bandwidth is increasing exponentially. However, the network infrastructure (including routers, servers, daemons, protocols, etc.) is still using relatively old technologies. As a result, Internet applications and network routers cannot keep up with the speed of the bandwidth increase. At the same time, more and more devices and applications are becoming network enabled. The load that these devices and applications put on the network nodes have increased tremendously. The increase of network load and number of applications also makes the complexity of implementing and maintaining network applications much higher. As a result, the increase of network bandwidth and the ubiquitous use of network devices and applications can cause problems for routing and transmission of data in the old network infrastructure, particularly when publishing content to subscribers.

A model for having networks push information from servers to clients is the publish-subscribe style. In this model, the server becomes a simplified publisher of its information, without regard to which clients may be interested in that information or where they are located in the network. The clients become subscribers for information, with information delivered as it becomes available, potentially without regard to details about where in the network it was published. The network is then responsible for efficiently routing published information to subscribers, for matching information to active subscriptions, and for doing all of this in a way that is transparent to the publishers and subscribers.

Because the complexity of the server is greatly reduced in the publish-subscribe model, the distinction between a heavyweight server and a lightweight client can begin to disappear, or rather to merge into the notion of a peer that can be either publisher, or subscriber, or both. Numerous kinds of applications have a natural affinity for publish-subscribe-style interaction between peers. A common theme underlying many of these applications is that the information being published and subscribed for is in the form of events. For example, an investor buys or sells a stock, causing the price of the stock to change. A traffic incident occurs on a freeway, causing traffic on the freeway to back up. A security hole in a software system is discovered, causing a patch to be developed for the users of the software. A player fires a weapon in an Internet game, causing another player's avatar to die. All of these exemplary phenomena are events that are potentially of interest to large numbers of subscribers and can be propagated over a network to notify those subscribers that the events happened. An event is thus simply a self-contained, succinct piece of information about something potentially interesting that happened at some point in time at some place on the network.

Another example involves a scheduled broadcast, which has differing characteristics from applications involving only asynchronous events where the time of events is unpredictable and random. First, the event is scheduled to take place at a known time. Secondly, an event does not need to be a succinct piece of information. Instead, it could be a massive amount of data. Directing this massive load of data to the parts of the network where interested subscribers are found requires substantial server processing.

Typically the server or publisher performs the routing decisions for the network in order to instruct the network on where to send published content in the publish-subscribe model. The publisher stores the subscriptions for content that it publishes. Upon receiving or generating new content, the publisher compares the content with each of the subscriptions to identify any matches. If the content (event) satisfies any subscriptions, the publisher pushes the content to the corresponding subscriber via the network. This conventional publish-subscribe model places a tremendous burden on the publishers, particular as more devices become network-enabled and as the number of subscriptions increases. A complementary approach can be just as odious—a subscriber evaluates its own subscriptions on all published events.

With greater convergence of untold numbers of applications across the Internet, the possibilities for exploiting event notification become endless. However, those possibilities require a more efficient way to make routing decisions and determine when events satisfy subscriptions, alleviating the burden on the publishers. Thus, a pervasive, persistent event notification service could provide tremendous value-added benefit for Internet applications, as well as other applications and implementations.

SUMMARY OF THE INVENTION

A method and apparatus provide for providing persistence of messages transmitted via a network. Messages are received via the network. The messages are stored for later retrieval. Persistent and reliable delivery of the messages is provided in response to failures relating to the network.

Another method and apparatus provide for persistent caching of methods delivered via a publish-subscribe network. At a first node, a message having data via the network is received. The data is time-marked. The data is cached in a cache memory at the first node. The message is routed to a second node using content-based routing. These steps are repeated at a second node. A router that includes modules for executing this method is provided. A publish-subscribe network that includes nodes that include modules for executing this method is provided. A computer-readable medium that includes instructions for executing this method is provided.

Still another method provides for persistent caching of messages delivered via a publish-subscribe network. The method includes receiving a message having data via the publish-subscribe network, time-marking the data, caching the data in a cache memory, determining if a time granularity G has passed since the caching step, moving the cached data to a disk based on a determination that G has passed, determining if a persistent time-frame T has passed since the caching step for a last block of the cached data, and deleting the cached data from the disk based on a determination that T has passed for the last block of the cached data. A router that includes modules for executing this method is provided. A publish-subscribe network that includes nodes that include modules for executing this method is provided. A computer-readable medium that includes instructions for executing this method is provided.

Yet another method provides persistent caching of messages delivered via a publish-subscribe network. The method includes (a) receiving a plurality of messages having data via the network at a plurality of upstream nodes, (b) time-marking the data, (c) caching the data in cache memories at the plurality of upstream nodes, (d) routing the messages to an edge node using content-based routing and, (e) repeating steps (a) through (c) at the edge node, wherein the data is cached in a cache memory at the second node. A publish-subscribe network that includes a plurality of upstream nodes and an edge node, the nodes including modules for executing this method, is provided.

BRIEF DESCRIPTION OF THE DRAWINGS

The accompanying drawings are incorporated in and constitute a part of this specification and, together with the description, explain the advantages and principles of the invention.

FIG. 18 is a diagram illustrating an example of encoding of a message.

DETAILED DESCRIPTION

Overview

Figure 1:
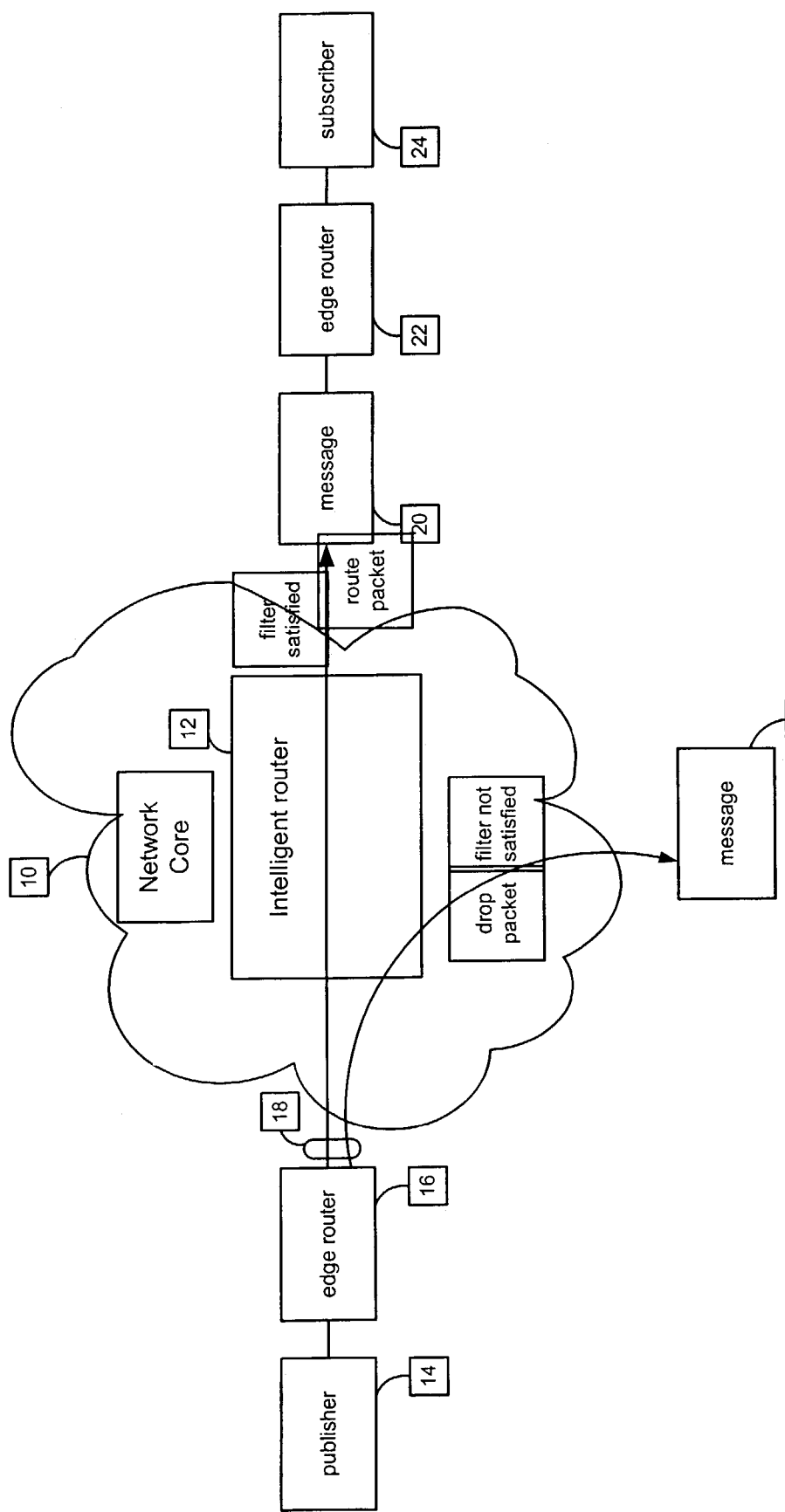
FIG. 1 is a diagram illustrating intelligent routing in a network core.

An Internet-scale, or other distributed network-scale, event notification system provides applications with a powerful and flexible realization of publish-subscribe networking. In this system, an application program uses event notification application program interfaces (APIs) to publish notifications and/or to subscribe for and receive notifications about events occurring inside the network.

A notification in the system is given a subject, which is a string or other structure that classifies the kind of information the notification encapsulates. Also, a notification is completed with a set of attributes containing information specific to the notification. For example, an application might publish notifications about transactions on the New York Stock Exchange using the subject quotes.nyse and attributes symbol and price. The application might publish an individual notification having specific attribute values, for example with symbol equal to SNE (the stock ticker symbol for Sony Corporation) and price equal to 85.25. Most if not all of the attributes in a notification are predefined, in the sense that they are found in all notifications for the same family of subjects. However, publishers can add discretionary attributes on a per-notification or other basis in order to provide additional event-specific information. Therefore, not all or even any attributes need be predefined.

In this system, subscribers are not restricted to subscribing only for subjects or whole channels. Channels are further explained and defined below. They can include an hierarchical structure specifying, for example, a subject field and one or more levels of related sub-fields (sub-subjects). Thus, subscribers can provide much more finely-tuned expressions of interest by specifying content-based filters over the attributes of notifications. For example, a subscriber might subscribe for all notifications for the subject quotes.nyse having symbol equal to SNE and price greater than 90.00 (indicating perhaps a sell opportunity for a block of shares owned by the subscriber). All notifications matching the subscription can be delivered to the subscriber via a callback or other type of function that the subscriber provides at the time it registers its subscription or at other times. One subscription can be broken down into many filters.

The callback can perform many computations, including something as simple as writing a message to a terminal or sending an e-mail, to something more complex such as initiating the sale of a block of shares, and to something even more complex that initiates new publish-subscribe activity (for example, replacing the existing subscription with a new subscription for a buy opportunity at a price of 75.00, or publishing a new notification that the subscriber's portfolio has been modified).

Applications are aided in their publishing and subscribing activities by agents, for example. The agents can possibly make use of or be implemented with proxies. The agents, when used, provide network connectivity for outgoing notifications and subscriptions and delivery of incoming matching notifications to subscribers. Once a notification enters the network, the system's network of routers propagate the notifications to all subscribers whose subscriptions match the notification. One way of accomplishing this would be to broadcast the notification to all points of the network and then let the application agents decide whether the notification is relevant to their subscribers. However, this is not necessarily a scalable approach—the network would usually be quickly overwhelmed by the load of message traffic, especially in the presence of large numbers of active and verbose publishers. And even if sufficient bandwidth were not a problem, the subscribers would be overwhelmed by having to process so many notifications.

The system's exemplary network is much more efficient in the way it routes notifications. First, it can use multicast routing to ensure that a notification is propagated, for example, at most once over any link in the network. Second, it can employ a large number of sophisticated optimizations on filters to reduce as much as possible the propagation of notifications.

FIG. 1 is a diagram conceptually illustrating this intelligent routing in a network core. A publisher 14 transmits content in messages via an edge router 16 to a network core 10, used in a publish-subscribe network. A publish-subscribe network includes any type of network for routing data or content from publishers to subscribers. The content is transmitted via one or more channels 18 representing logical connections between routers or other devices. An intelligent router 12 in network core 10 determines whether to route or forward the message. In particular, intelligent router 12 can determine if the message includes content as subscribed to by a subscriber 24.

Each subscription encapsulates a subject filter and an attribute filter. Routers can possibly expand a subject filter to the set of matching subjects and merge attribute filters on a per-subject basis. An intelligent router evaluates the subject filter against the subject of notifications, and evaluates the attribute filter against the attribute values in notifications. The syntax for subject filters can possibly use wildcards, and the syntax for attribute filters can use Boolean expressions, both of which are further explained below. The term "filter" is used to describe a set of events that a subscriber is interested in receiving from publishers. Routing rules are generated from the filters and are used by intelligent routers to make routing decisions.

Therefore, if the entire filter set is not satisfied by a message 26, for example, intelligent router 12 drops (discards) message 26, meaning that the message is not forwarded. If any filter of the entire set is satisfied by a message 20 according to the evaluations of subject and attribute filters, for example, intelligent router 12 routes (forwards) message 20 via edge router 22 and possibly other devices to a subscriber 24, or performs other functions internal to router 12 with message 20, according to all the routing and/or action rules prescribed for the matching filter. The search will continue until either the entire set of filters has been exhausted, or decisions about all the rules have been obtained, whichever comes first.

This type of intelligent content-based routing in a network core provides for real-time data delivery of, for example, alerts and updates. Examples of real-time data delivery for alerts include, but are not limited to, the following: stock quotes, traffic, news, travel, weather, fraud detection, security, telematics, factory automation, supply chain management, and network management. Examples of real-time data delivery for updates include, but are not limited to, the following: software updates, anti-virus updates, movie and music delivery, workflow, storage management, and cache consistency. Many other applications are possible for delivery of information for subscriptions.

Table 1 illustrates storing of subscriptions with subjects and predicates for the filtering. They can be stored in any type of data structure, as desired or necessary, anywhere in the network. As explained below, the predicates are components of subscriptions. The subscriptions can be expressed in any way, examples of which are provided below.

TABLE 1

| subscription 1 | subject 1 | predicate 1 |
| --- | --- | --- |
| ... | | |
| subscription N | subject N | predicate N |

Table 2 provides an example of a publication and subscription for a quote server. This example is provided for illustrative purposes only, and subscriptions can include any number and types of parameters for any type of data or content.

TABLE 2

| Quote Server Example ||
| --- | --- |
| Subject Tree | Publication |
| Quotes.NYSE | subject = Quotes.NYSE |
| Quotes.AMEX | Attributes |
| Quotes.NASDAQ | Symbol = SNE |
| | Price = 51 |
| | Volume = 1000000 |
| Attributes | Subscription |
| Symbol | Subject == Quotes.NYSE |
| Price | Filter |
| Volume | (Symbol == SNE) & (Price > 55) |

The predicates provide the Boolean expressions for the subscription and the subjects provide an indication of a channel for the subscription. Subscriptions can be expressed in many different ways. Use of Boolean expressions is one such example and provides an ability to easily convert the subscription into a subject filter and an attribute filter for content-based routing. Subscriptions can alternatively be expressed without reference to a subject; however, use of a subject or channel (further explained below) provides a context for interpreting and applying filters to attributes.

The routing decisions can be accomplished in the network core and distributed throughout the network, alleviating processing burdens on publisher and subscriber machines, and significantly enhancing the efficiency of the network. FIG. 1 illustrates one publisher, one subscriber, and one intelligent router for illustrative purposes only; implementations can include many publishers, subscribers, and intelligent routers. The term intelligent router refers to a router or other entity having the ability to make routing decisions by inspecting the payload of a packet or message in a network core or other locations.

Network Infrastructure

Figure 2:
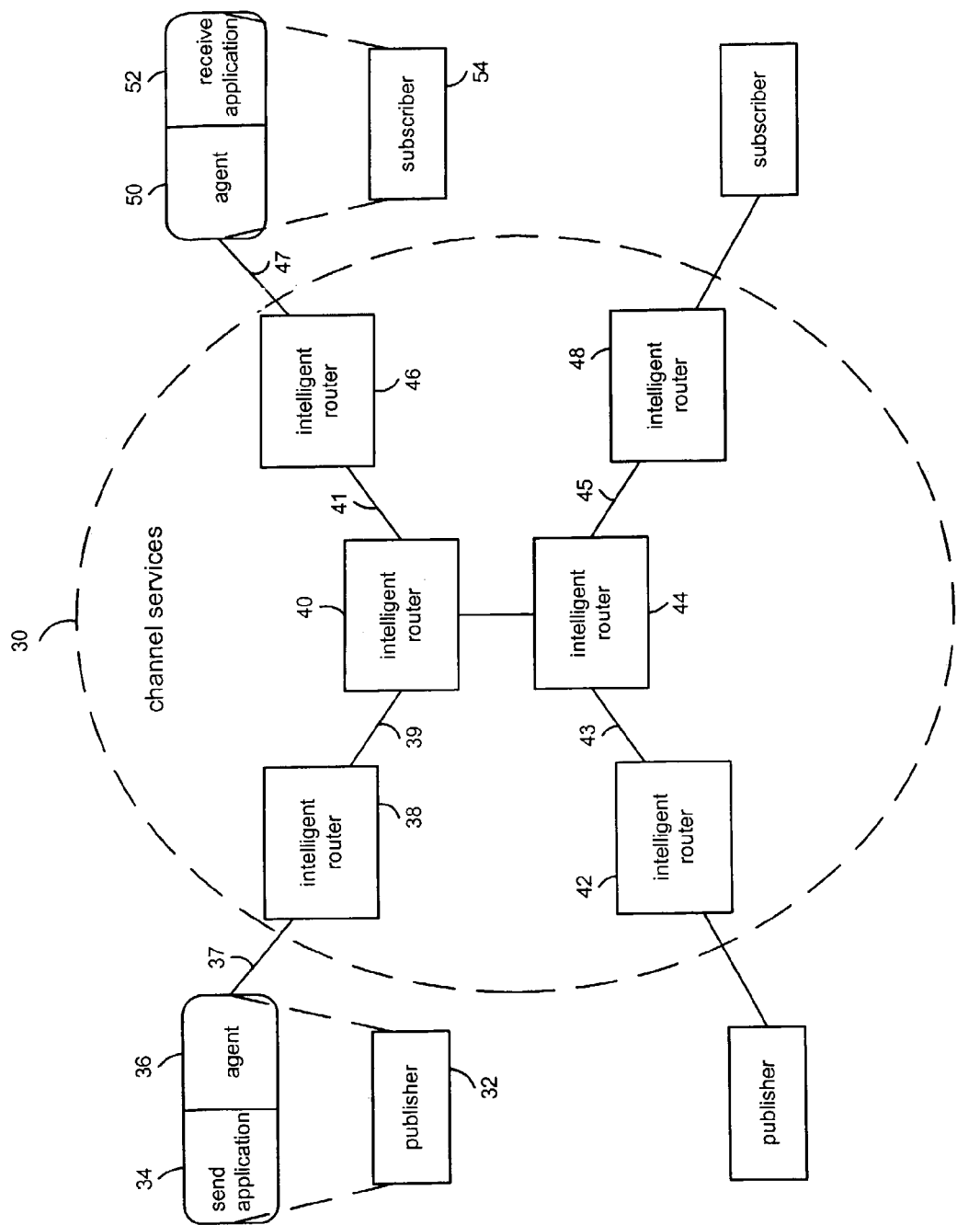
FIG. 2 is a network diagram illustrating intelligent routers for publishers and subscribers.

FIG. 2 is a network diagram illustrating intelligent routers for publishers and subscribers. A routing entity 30 providing channel services is, for example, effectively layered on a network infrastructure, as explained below, for routing messages among intelligent routers. A publisher 32 conceptually includes, for example, an application 34 to receive an indication of published content, such as a pointer for retrieving the content, and an agent 36 to encode the content for network transmission via channel services 30. A collection of logically interconnected intelligent routers 38, 40, 42, 44, 46, and 48 route the content from the publisher using routing rules generated from subject filters and attribute filters for subscriptions. A plurality of links 39, 41, 43, and 45 provide the logical connections between intelligent routers 38, 40, 42, 44, 46, and 48. Other links 37 and 47 provide, respectively, logical connections between publisher 32 and intelligent router 38, and between a subscriber 54 and intelligent router 46. Subscriber 54 includes an agent 50 to detect and receive the subscribed content, and an application 52 to present the content.

A channel can include, for example, a related set of logical multicast connections implemented in a distributed manner. A channel in this exemplary embodiment is a logically related collection of network resources used to serve a community of publishers and subscribers exchanging content. The content is classified according to the channel subject namespace, and the resources are managed, controlled, and provisioned via channel services provided by channel managers. Multiple channels may share the same resources. Channels can provide a highly scalable directory service such as, but not limited to, the following examples: publisher and subscriber information, authentication and authorization information, message types, management information, and accounting and billing information. Channels can also provide, for example, persistence through caching, a fast data delivery mechanism, security, and user and network management. Channels can be used for any other purpose as well.

The filtering by the intelligent routers can occur in a network core to distribute routing decisions. In addition, intelligent routers can also function as edge routers connecting a user device, such as a publisher or subscriber, with the network core. Also, the same device connected to the network can function as both a publisher to push content to subscribers via routing decisions in the network and as a subscriber to received pushed content. The intelligent routers and channels can be connected in any configuration, as necessary or desired for particular implementations, and the configuration shown in FIG. 2 is provided for illustrative purposes only.

Figure 3:
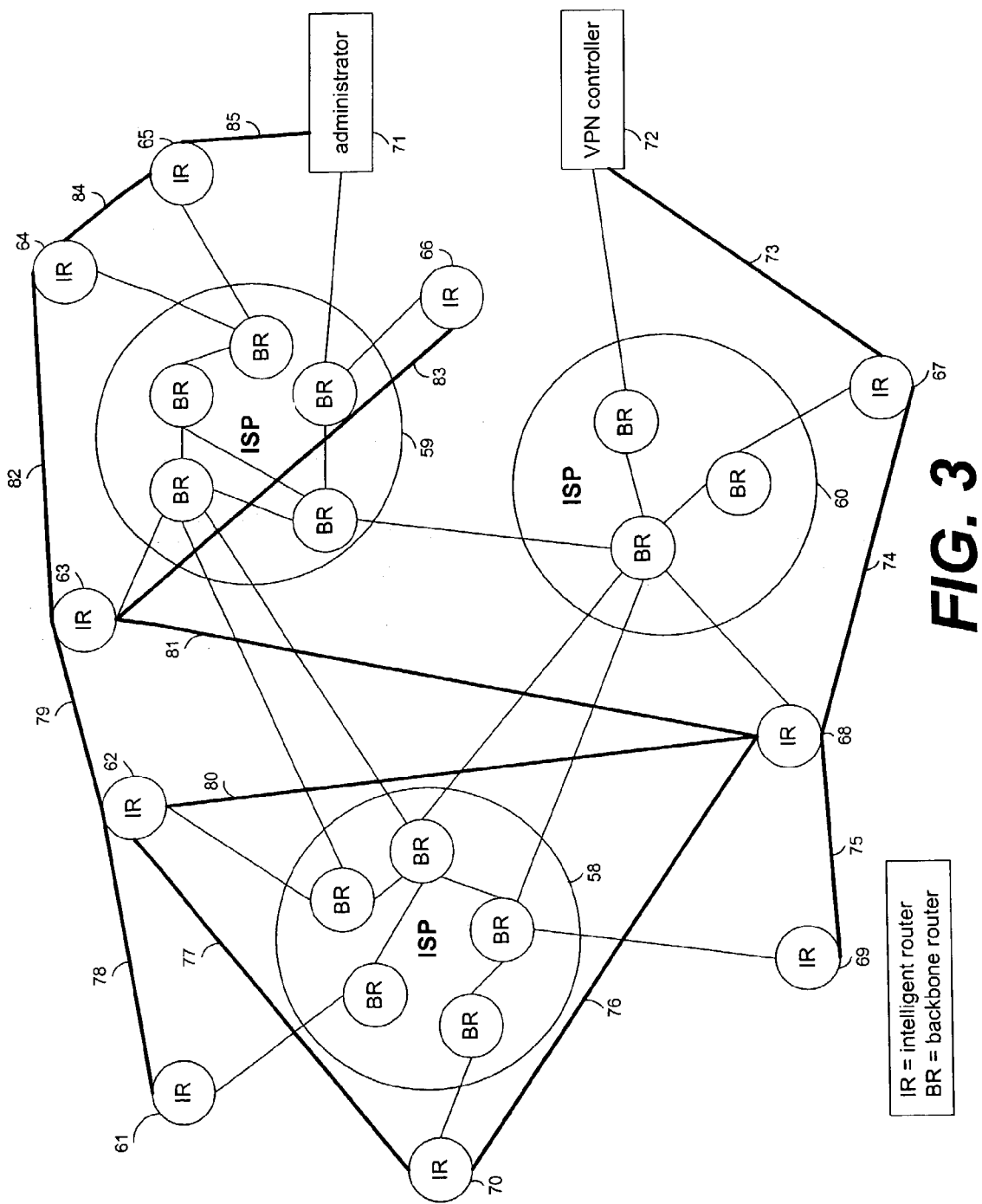
FIG. 3 is a diagram illustrating a network infrastructure for intelligent routers and backbone routers.

FIG. 3 is a diagram of an exemplary network infrastructure for intelligent routers and conventional backbone routers, also illustrating logical connections for channels. The intelligent routers in this example use existing backbone routers in the network, such as the Internet or other distributed network, and the intelligent routers are thus effectively layered on the backbone routers. In this example, Internet Service Provider (ISP) networks 58, 59, and 60 each include several backbone routers for conventional routing of messages or packets. A plurality of intelligent routers 61-70 are connected with one or more backbone routers in ISP networks 58, 59, and 60. Intelligent routers 61-70 are also interconnected by a plurality of links 73-85, representing examples of links, and can be connected to end user devices by the links as well. Intelligent routers 61-70 can be controlled by one or more administrator machines such as an entity 71, and one or more virtual private network (VPN) controllers such as an entity 72. The ISP networks 58, 59, and 60 would also be connected to publisher and subscriber machines (not shown in FIG. 3). The backbone routers in and among ISPs 58, 59, and 60 are interconnected in any conventional way within the existing network infrastructure.

The intelligent routers 61-70 and links 73-85, as illustrated, can be implemented using existing network infrastructure, and they provide for content-based routing in the network core. The links 73-85 represent logical connections between intelligent routers 61-70 and can be implemented using, for example, existing network infrastructure or other devices. A link, for example, can be implemented using a logical connection called the tunnel. A tunnel includes the hardware, and possibly software, network infrastructure for implementing a link, and one tunnel can be a component of multiple channels. The channels facilitate content-based routing in the intelligent routers by providing logical configurations for particular types of content and thus providing a context for attributes transmitted over the channels. Although intelligent routers can perform routing decisions without channels, the channels enhance the efficiency of content-based routing by the intelligent routers in the network core.

This exemplary embodiment includes use of channels and links. A link is a connection between two routers—albeit intelligent routers. A channel is a network entity encompassing a (typically large) collection of routers, configured statically or dynamically by the interconnecting links to achieve one-to-many or many-to-many logical connections. In particular, a channel is a top-level logical entity describing the essential characteristics of the channel. Under one channel, there could be many subjects. Each subject will form a sub-network (such as a multicast tree) involving a collection of interconnected routers. These subject-based sub-networks can be allocated, oriented, and configured in different manners. The channel, being a collection of all the sub-networks formed for the subjects under it, may resemble a mesh of networks, for example.

Figure 4:
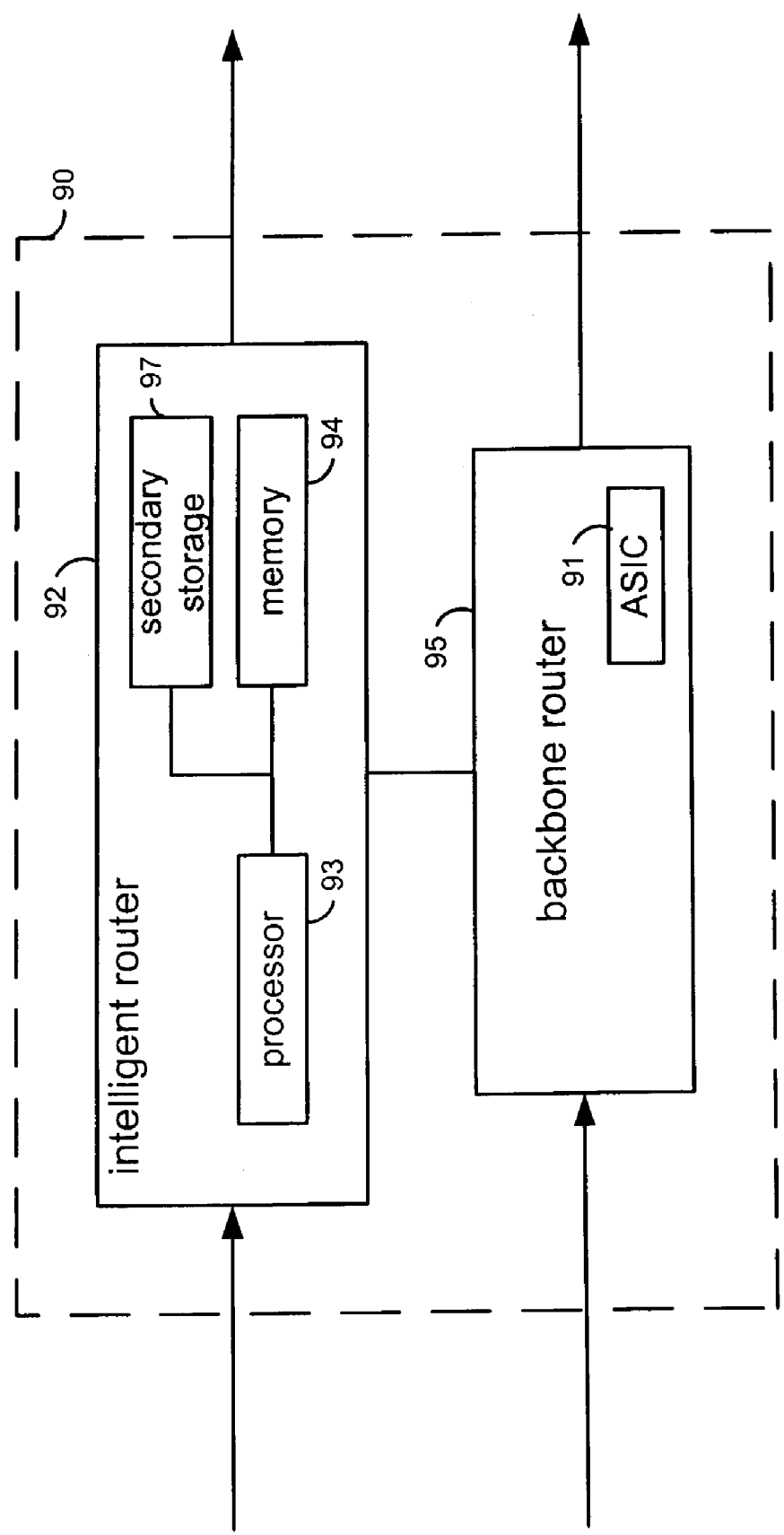
FIG. 4 is a diagram of hardware components of an intelligent router.

FIG. 4 is a diagram of exemplary hardware components of an intelligent router 92, which can correspond with any of the other referenced intelligent routers. A network node 90 can include intelligent router 92 connected with a conventional backbone router 95. Intelligent router 92 includes a processor 93 connected to a memory 94 and a secondary storage 97 (possibly implemented with a detached machine, for example), either of which can store data, as well as cache data, and store applications for execution by processor 93. Secondary storage 97 provides non-volatile storage of data. Under software control as explained below, processor 93 provides instructions to backbone router 95 for it to route (forward) or not route (discard) messages or packets based upon routing rules generated from subject filters and attribute filters for subscriptions. Although shown as implemented in a separate processor-controlled device, intelligent router 92 can alternatively be implemented in an application specific integrated circuit (ASIC) within backbone router 95 to provide the intelligent routing functions in hardware possibly with embedded software. The intelligent routing functions can also be alternatively implemented in a combination of software and hardware in one or multiple routing devices.

Figure 5:
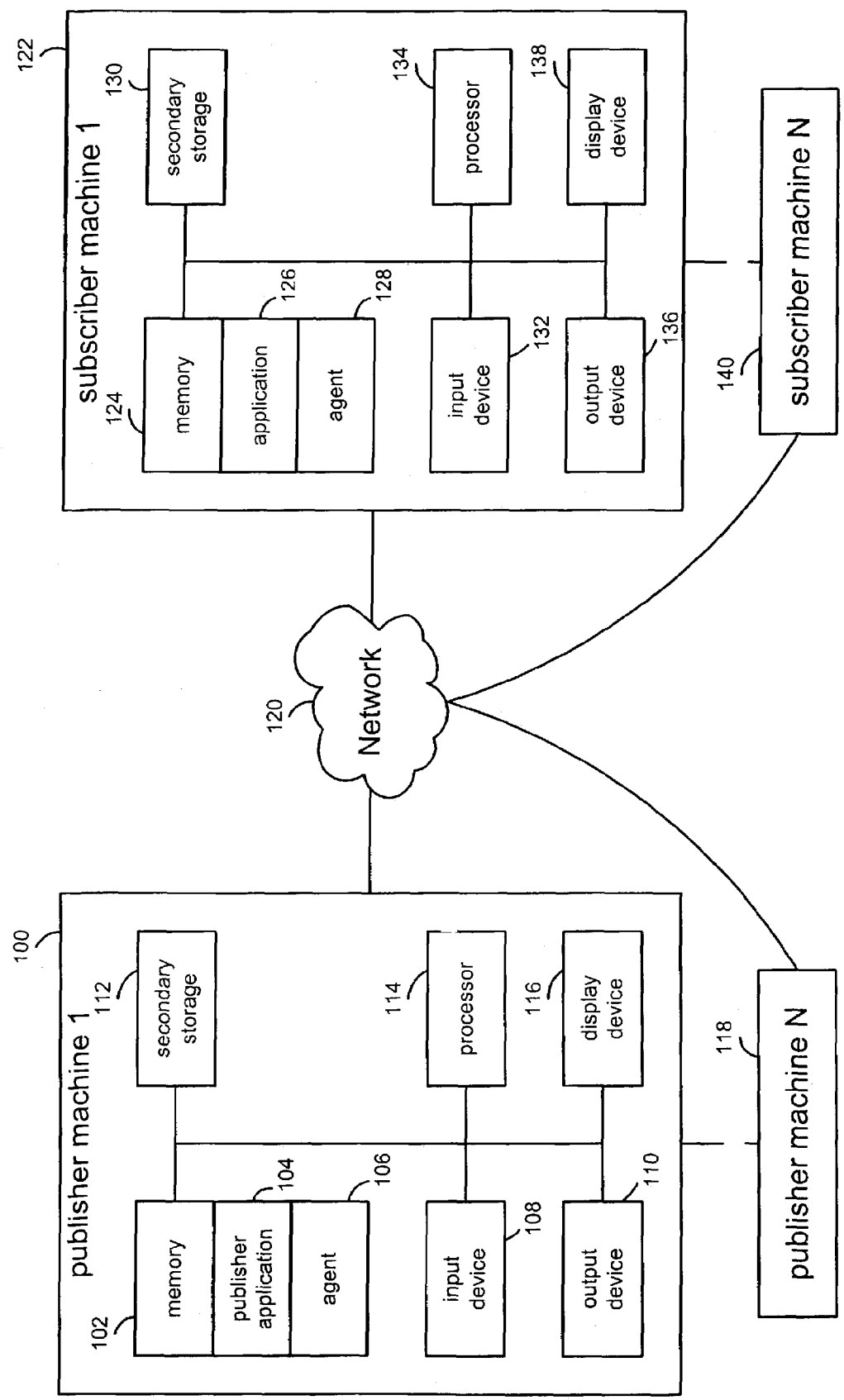
FIG. 5 is a diagram of publisher and subscriber machines.

FIG. 5 is a diagram of exemplary publisher and subscriber machines. A publisher machine 100 or 118 can include the following components: a memory 102 storing one or more publisher applications 104 and an agent application 105; a secondary storage device 112 providing non-volatile storage of data; an input device 108 for entering information or commands; a processor 114 for executing applications stored in memory 102 or received from other storage devices; an output device 110 for outputting information; and a display device 116 for providing a visual display of information.

A subscriber machine 122 or 140 can include the following components: a memory 124 storing one or more applications 126 and an agent application 128; a secondary storage device 130 providing non-volatile storage of data; an input device 132 for entering information or commands; a processor 134 for executing applications stored in memory 124 or received from other storage devices; an output device 136 for outputting information; and a display device 138 for providing a visual display of information. Publisher and subscriber machines can alternatively include more or fewer components, or different components, in any configuration.

Publisher machines 100 and 118 are connected with subscriber machines 122 and 140 via a network 120 such as the network described above. Network 120 includes intelligent routers for providing distributed routing of data or content in the network core via packets or messages. Although only two publisher and subscriber machines are shown, network 120 can be scaled to include more publisher and subscriber machines. The publisher and subscriber machines can be implemented with any processor-controlled device such as, but not limited to, the following examples: a server; a personal computer; a notebook computer; a personal digital assistant; a telephone; a cellular telephone; a pager; or other devices. Network 120 with intelligent routers can include any wireline or wireless distributed network, connecting wired devices, wireless devices, or both. Network 120 can also potentially use existing or conventional network infrastructure.

Figure 6:
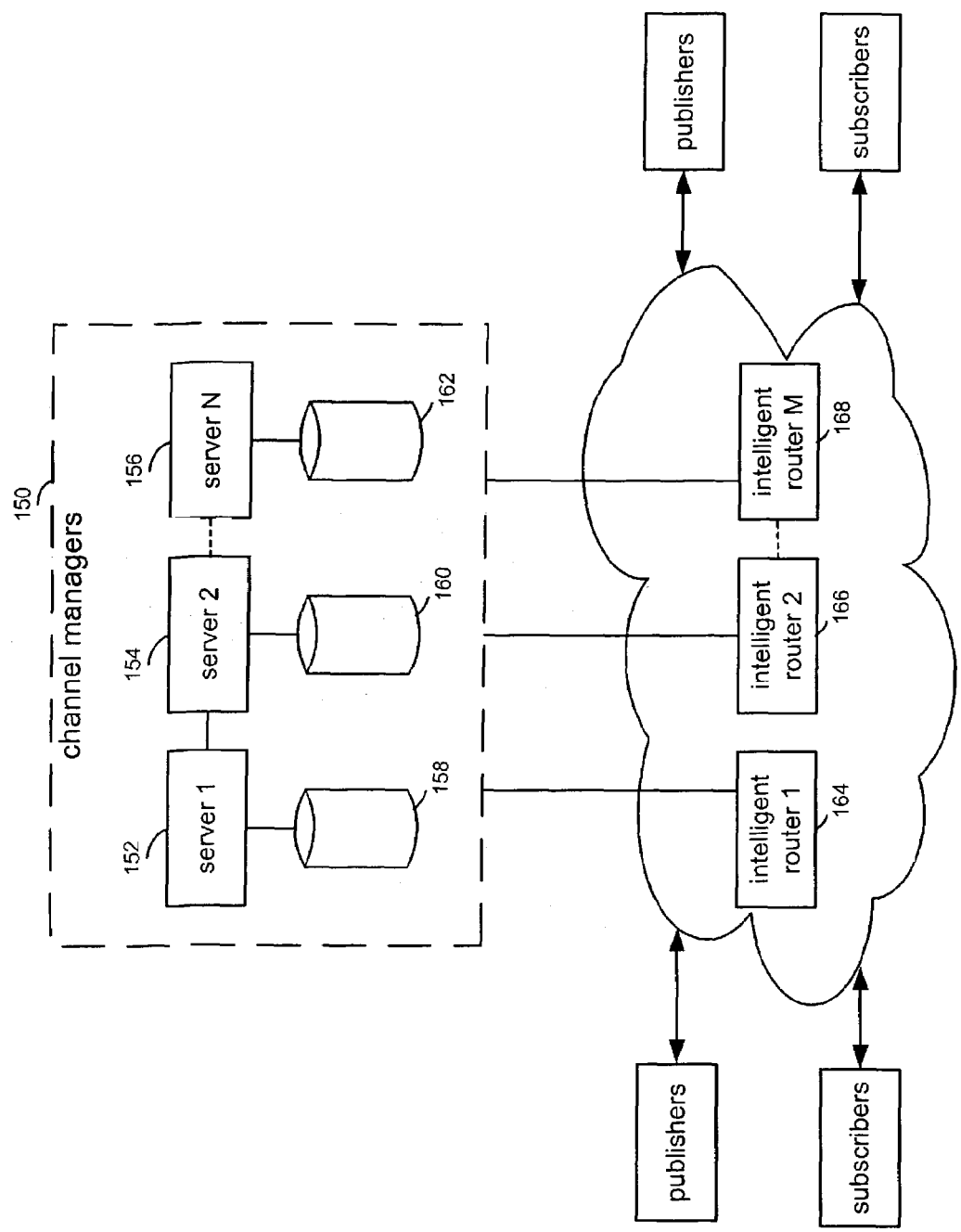
FIG. 6 is a diagram of channel managers for intelligent routers.

FIG. 6 is a diagram illustrating channel managers 150 for intelligent routers. In this example, channel managers 150 are implemented with multiple servers 152, 154, and 156. Each server includes its own local storage 158, 160, and 162. Intelligent routers 164, 166, and 168 contact channel managers for information about particular channels. The channel managers can also provide for data persistence, fail over functions, or other functions. The channel managers thus provide the channel services, which include a database or set of databases anywhere in the network specifying, for example, channel-related information, properties for data persistence, user information for publishers and subscribers, and infrastructure information. The infrastructure information can include, for example, an identification of intelligent routers and corresponding tunnels connecting them, subjects for the channels, and attributes for the channels (a name and type for each attribute). Packets or messages can also carry channel-related information including identification of fixed attributes and variable attributes.

A user when on-line can download channel information. For example, a user can register by using a user name and password. Upon authenticating the user's log-on, the user can open (invoke) a channel and retrieve information about the channel from the channel managers. Publishers can use that information in publishing content, and subscribers can use that information for entering and registering subscriptions.

Each channel manager 152, 154, and 156, in this example, acts as a primary for each intelligent router. In particular, each intelligent router is provided two Internet Protocol (IP) addresses in this example, one for a primary channel manager and another for a back-up channel manager. The intelligent routers use those IP addresses to contact a channel manager and retrieve channel information. If the primary fails, an intelligent router can contact a back-up channel manager. The channel managers 152, 154, and 156 thus share data, as indicated by the lines connecting them, concerning channel properties and other information. Each channel manager also has a designated back-up so that if the channel manager fails, another one can take over processing for it. Devices in the network can use commands, for example, to retrieve channel information, examples of which are provided in Table 3. Intelligent routers can alternatively only have a primary channel manager or more than two channel managers.

Figure 7:
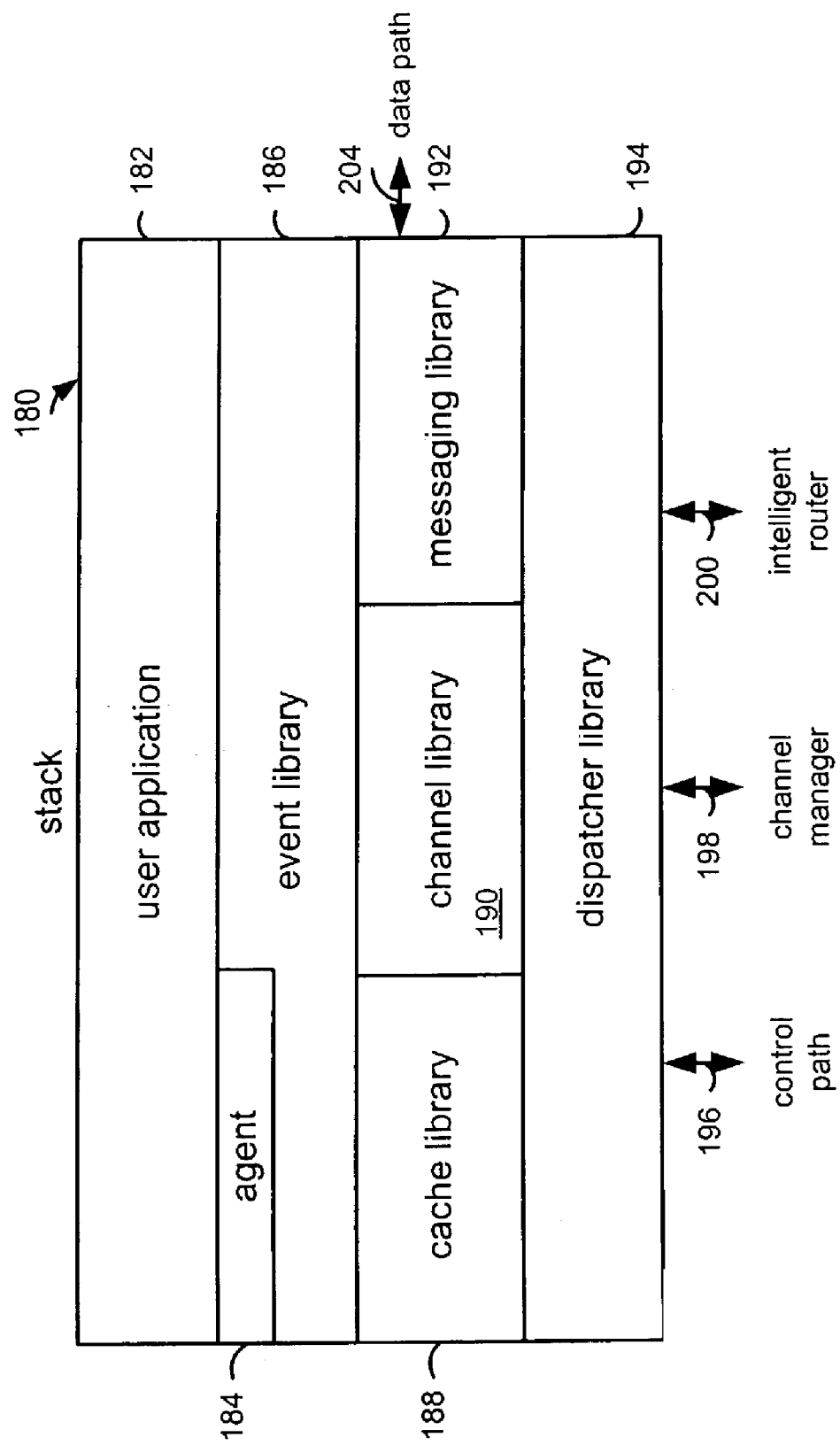
FIG. 7 is a diagram of software components in a user machine for interfacing the machine with intelligent routers

FIG. 7 is a diagram of exemplary software components in a stack 180 in a user machine or device for connecting it with a network having intelligent routers. The user machine can be used as a publisher, subscriber, or both, and it can include the exemplary devices identified above. Stack 180 can include one or more user applications 182, which can provide for receiving subscriptions from a user, receiving channel information from a publisher, or receiving content or data to be published. User application 182 can also include any other type of application for execution by a user machine or device.

The stack 180 can also include, for example, an agent 184, an event library 186, a cache library 188, a channel library 190, a messaging library 192, and a dispatcher library 194. Agent 184 provides for establishing network connections or other functions, and Table 3 provides examples of commands implemented by agent 184, which can use proxy commands or other types of commands. Event library 186 logs events concerning a user machine or other events or information. Cache library 188 provides for local caching of data. Channel library 190 stores identifications of channels and information for them. Dispatcher library 194 provides connections with a control path 196, a channel manager 198, and one or more intelligent routers 200, and it can include the exemplary functions identified in Table 4. Messaging library 192 provides a connection with a data path 204.

Tables 5-9 provide examples of messaging APIs in the C programming language. Tables 5 and 6 provide examples of APIs to send and retrieve messages. Tables 7 and 8 provide examples of APIs to send and retrieve notifications. Table 9 provides examples of APIs to send and retrieve control messages. These APIs and other APIs, programs, and data structures in this description are provided only as examples for implementing particular functions or features, and implementations can include any type of APIs or other software entities in any programming language.

TABLE 3

Examples of Agent Commands

| command | function |
| --- | --- |
| pc.chn.open | open channel, retrieve all information for channel, and locally cache it |
| pc.chn.close | close channel |
| pc.chn.getRouterInfo | retrieve information for routers on channel |
| pc.chn.getAttributeInfo | retrieve information for attributes of channel |
| pc.chn.getProperties | retrieve properties for channel |

TABLE 4

Dispatcher Functions

| | |
| --- | --- |
| Server-Side | Listens for connections (sits on accept). Creates a thread to handle each connection. The thread is responsible for receiving and processing all requests coming on that connection. |
| Client-Side | Creates a thread that initiates a connection and is responsible for receiving and processing all data coming into the connection. |

TABLE 5

Example of API to Send a Message

| | |
| --- | --- |
| PC_Status | PC_msg_init(ChannelHandle ch, PC_UINT chld, PC_UINT userid, PC_TypeInfo* MsgType, PC_UINT msgTypeSize, PC_msg_SessionHandle *sess); |
| PC_Status | PC_msg_cleanup(PC_msg_SessionHandle sess); |
| PC_Status | PC_msg_closeTransport(PC_msg_SessionHandle sess); |
| PC_Status | PC_msg_create(PC_msg_SessionHandle s, PC_msg_DataType dType, PC_msg_MsgHandle *msg); |
| PC_Status | PC_msg_delete(PC_msg_MsgHandle msg); |
| PC_Status | PC_msg_clone(PC_msg_MsgHandle org, PC_msg_MsgHandle *new); |
| PC_Status | PC_msg_setSubject(PC_msg_MsgHandle msg, PC_CHAR *subject); |
| PC_Status | PC_msg_setSubjectint(PC_msg_MsgHandle msg, PC_USHORT *subjectArray, PC_UINT arraySize); |
| PC_Status | PC_msg_setAttrByNameInt(PC_msg_MSGHandle msg, const PC_CHAR *name, PC_INT value); // for each type |
| PC_Status | PC_msg_setAttrByPosInt(PC_msg_MsgHandle msg, PC_UINT attributePos, PC_INT Value); // for each type |
| PC_Status | PC_msg_addAttrInt(PC_msg_MsgHandle msg, const PC_CHAR *name, PC_INT value); // for each type |
| PC_Status | PC_msg_send(PC_msg_MsgHandle msg); |

TABLE 6

Example of API to Retrieve a Message

```
typedef struct_attribute {
    PC_CHAR       *name;
    PC_TypeCode   type;
    void          *value;
    PC_UINT       arraySize;
} PC_msg_Attribute;
typedef struct_attributeArray {
    PC_UINT             size;
    PC_msg_Attribute    **attrs;
} PC_msg_AttributeArray;
```

| | |
| --- | --- |
| PC_Status | PC_msg_init(ChannelHandle ch, PC_UINT chld, PC_UINT userid, PC_TypeInfo* MsgType, PC_INT msgTypeSize, PC_msg_SessionHandle *sess); |
| PC_Status | PC_msg_cleanup(PC_msg_SessionHandle sess); |
| PC_Status | PC_msg_recv(PC_msg_SessionHandle sh, PC_msg_MsgHandle *msg); |
| PC_Status | PC_msg_ctrlRecv(PC_msg_SessionHandle sh, PC_msg_MsgHandle *msg); |
| PC_Status | PC_msg_getSequenceNum(PC_msg_MsgHandle msg, PC_UINT *seqNo); |
| PC_Status | PC_msg_getPublisherInfo(PC_msg_MsgHandle msg, PC_msg_PublicInfo *pub); |
| PC_Status | PC_msg_getSubject(PC_msg_MsgHandle msg, PC_CHAR **subject); |
| PC_Status | PC_msg_getSubjectInt(PC_msg_MsgHandle msg, PC_USHORT **subjectArray, PC_INT *size); |

TABLE 6-continued

Example of API to Retrieve a Message

| | |
|---|---|
| PC_Status | PC_msg_getDataType(PC_msg_MsgHandle hMsg, PC_msg_DataType *dataType); |
| PC_Status | PC_msg_getAttrByPosInt(PC_msg_MsgHandle msg, PC_UINT pos, PC_INT *val); // for each type |
| PC_Status | PC_msg_getAttrValueByNameInt(PC_msg_MsgHandle msg, const PC_CHAR *name PC_INT *val); |
| PC_Status | PC_msg_getAttrTypes(PC_msg_MsgHandle msg, PC_TypeCode* Types, PC_INT *arraySize); |
| PC_Status | PC_msg_getAttributeByPos(PC_msg_MsgHandle msg, PC_UINT attributePos, PC_msg_Attribute **attr); |
| PC_Status | PC_msg_getAttributeByName(PC_msg_MsgHandle msg, const PC_CHAR *name PC_msg_Attribute **attr); |
| PC_Status | PC_msg_getPredefinedAttributes(PC_msg_MsgHandle msg, PC_msg_AttributeArray **attrs); |
| PC_Status | PC_msg_getDiscretionaryAttributes(PC_msg_MsgHandle msg, PC_msg_AttributeArray **attrs); |
| Void | PC_msg_freeAttribute(PC_msg Attribute *attr); |
| Void | PC_msg_freeAttributeArray(PC_msg_AttributeArray*attrArray); |

TABLE 7

Example of API to Send a Notification

```
ChannelHandle ch;
PC_msg_MsgHandle msg;
PC_msg_SessionHandle sh;
PC_msg_TypeInfo   Types[2];
Types [0].type = PC_STRING_TYPE;
Types [0].name = "company"
Types [1].type = PC_INT_TYPE;
Types [1].name = "stockvalue"
PC_msg_init(ch, chld, userId, Types, 2, &sh)
PC_msg_create(sh, PC_MSG_DATA, &msg);
PC_msg_setAttrValueByNameInt(msg, "stockvalue", 100);
PC_msg_setAttrValueByPosString(msg, 1, "PreCache");
PC_msg_addAttrString(msg, "comment", "mycomments");
PC_msg_send(msg);
PC_msg_delete(msg);
PC_msg_closeTransport(sh);
    PC_msg_cleanup(sh);
```

TABLE 8

Example of API to Retrieve a Notification

```
ChannelHandle ch;
PC_msg_MsgHandle msg:
PC_msg_SessionHandle sh;
PC_msg_TypeInfo   Types[2];
PC_msg_AttributeArray *attrArray;
PC_CHAR *company;
PC_INT value;
Types [0].type = PC_STRING_TYPE;
Types [0].name = "company"
Types [1].type = PC_INT_TYPE;
Types [1].name = "stockvalue"
PC_msg_init(ch, chld, userId, Types, 2, &sh);
While (1) {
    PC_msg_recv(sh, &msg);
    PC_msg_getAttrValueByPosString(msg, 0, &company);
    PC_msg_getAttrValueByNameInt(msg, "stockvalue", &value);
    PC_msg_getDynamicAttributes(msg, &attrArray);
    PC_msg_freeAttributeArray(attrArray);
    PC_msg_delete(msg);
}
PC_msg_closeTransport(sh);
    PC_msg_cleanup(sh);
```

TABLE 9

Example of APIs to Send and Retrieve Control Messages

| Sender Side Code | Receiver Side Code |
|---|---|
| ChannelHandle ch;<br>PC_msg_MsgHandle mh;<br>Int chld = 10;<br>// Get a Channel handle for channel 10<br>PC_msg_init(ch, chld, pubId, NULL, 0, &sh)<br>PC_msg_create(th, PC_MSG_CONTROL, &mh);<br>PC_msg_setSubject(mh, "#.ADD_SUBJECT");<br>PC_msg_addAttrInt(mh,,"ChannelId", chld);<br>PC_msg_addAttrString(mh, | ChannelHandle ch;<br>PC_msg_MsgHandle msg;<br>PC_msg_init(ch, chld, subId, NULL, 0, &sh);<br>for (;;) {<br>    PC_msg_recv(sh, &msg);<br>    PC_msg_getSubject(msg, &subject);<br>    PC_msg_getAttrValueByNameInt(<br>        msg, "ChannelId, &chld);<br>    PC_msg_getAttrValueByNameString(<br>        msg, "Subject", &subject);<br>    PC_msg_delete(msg);<br>}<br>PC_msg_closeTransport(sh); |

TABLE 9-continued

Example of APIs to Send and Retrieve Control Messages

| Sender Side Code | Receiver Side Code |
| --- | --- |
| "Subject", "Quote.cboe");<br>PC_msg_send(mh);<br>PC_msg_delete(mh); | PC_msg_cleanup(sh); |

Figure 8:
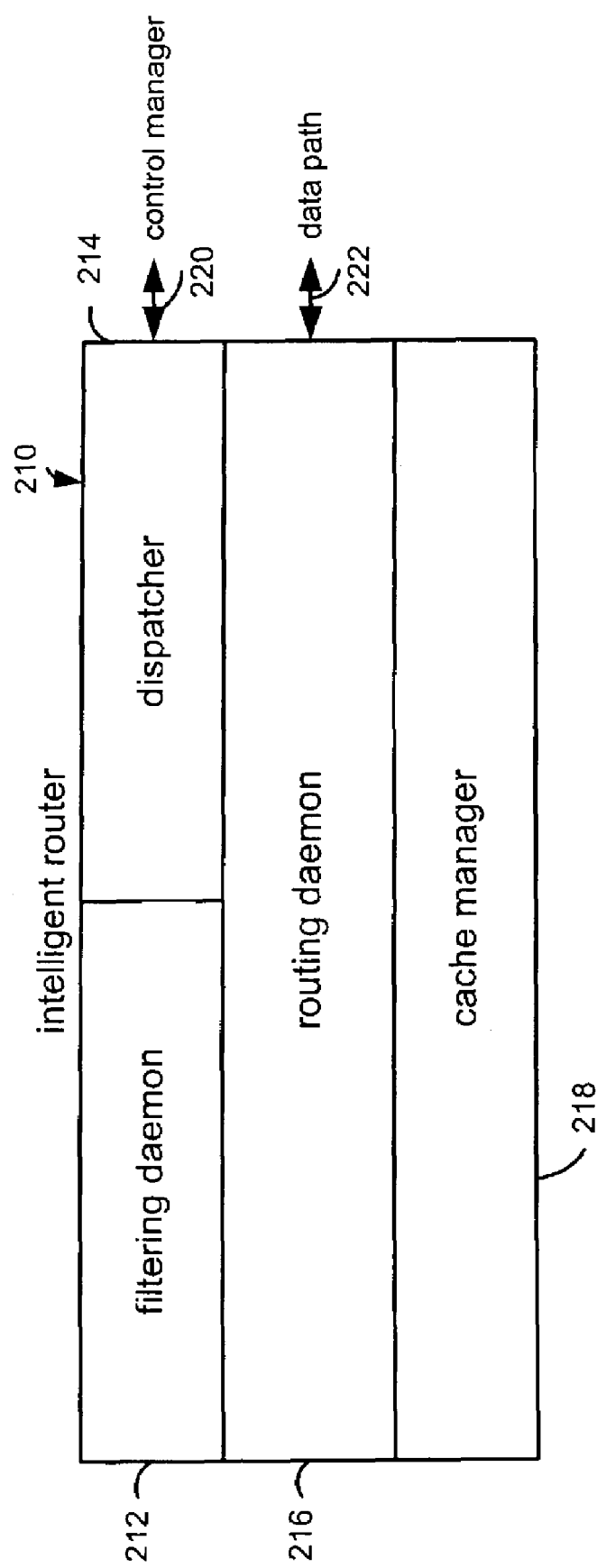
FIG. 8 is a diagram of software components for an intelligent router.

FIG. 8 is a diagram of exemplary software components 210 for an intelligent router such as those identified above and intelligent router 92 shown in FIG. 4. Software components 210 can be stored in, for example, memory 94 for execution by processor 93 in intelligent router 92. Components 210 include, for example, a filtering daemon 212, a dispatcher 214, a routing daemon 216, and a cache manager 218. Filtering daemon 212 provides filtering for content-based routing to process content for subscriptions according to routing rules, as explained below. Dispatcher 214 provides for communication of control messages such as those required for propagating filters via path 220, and the dispatcher can also provide for a single point of entry for users and one secure socket with channel managers, enhancing security of the network. In other words, users do not directly contact channel managers in this example, although they may in alternative implementations. Dispatcher 214 uses control messages to obtain attributes (name-value pairs) from a channel manager.

Routing daemon 216 provides for communication with a data path 222, which can occur via a conventional backbone router as illustrated in FIG. 4 or other routing device. Cache manager 218 provides for local caching of data at the network node including the corresponding intelligent router. The operation of cache manager 218 is further explained below, and it provides for distributed caching of data throughout the network core.

Content-based routing can be implemented at the kernel level, as an alternative to the application level. Memory accessible by the kernel is separate from that in the application layer. To have content-based routing running in the application requires, for example, that message data be copied from the kernel memory area to the application area, and switching the context of the application from that of the kernel to that of the routing application. Both can induce substantial overhead. If instead the kernel is modified to support content-based routing, the routing could take place much faster being rid of the overhead described above.

With this feature of content-based routing in the kernel, the routing daemon 216 may or may not directly send or receive data via the data path 222, depending on the implementation. The daemon is a process running in the application layer, pre-computing the content-based routing table to be injected into the kernel. Once injected, however, the routing table can be used by the kernel to make routing decisions. Similarly, the filtering daemon pre-computes the filtering table and injects it into the kernel. In this kernel implementation, neither the routing daemon nor the filtering daemon would directly interact with the data path.

Figure 9:
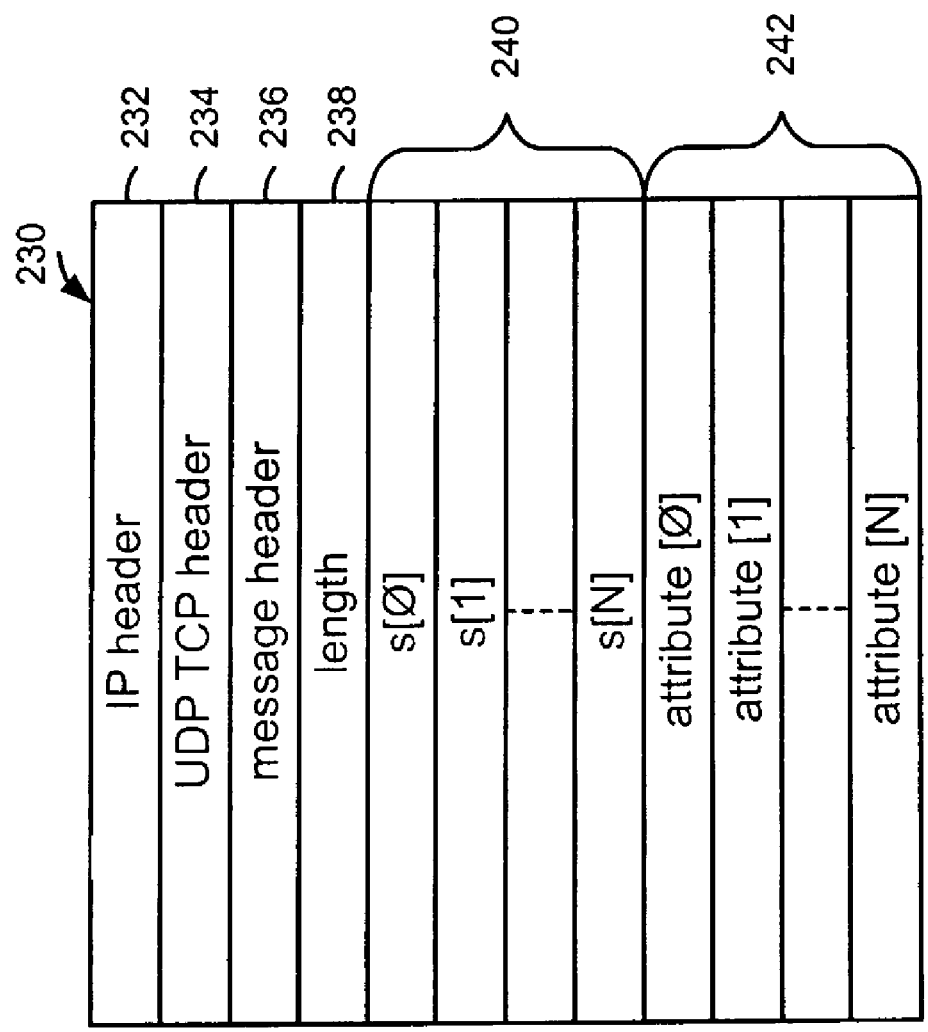
FIG. 9 is a diagram of a packet structure for a message.

FIG. 9 is a diagram of an example of a packet structure 230 for a message possibly including content for subscriptions. A packet or message for use in content-based routing includes, for example, a header section and a payload section. The header section specifies routing or other information. The payload section specifies data or content, or an indication of the data or content. Packet structure 230 includes an IP header 232, a User Datagram Protocol (UDP) Transmission Control Protocol (TCP) header 234, a length value 238, one or more subject fields 240, and one or more attributes 242. Packet structure 230 illustrates a basic structure for a length value and the subjects and attributes. A packet used in content-based routing can also include other or different elements, such as those illustrated in the example of FIG. 18 explained below, and packets for content-based routing can be configured in any manner. Also, the attributes can include discretionary attributes appended to the end of a message, for example. These discretionary attributes are ad-hoc information, for example, added by the publisher (or even routers) that cannot necessarily be conveyed using the message format prescribed for the channel.

Publisher and Subscriber Methodologies

Figure 10:
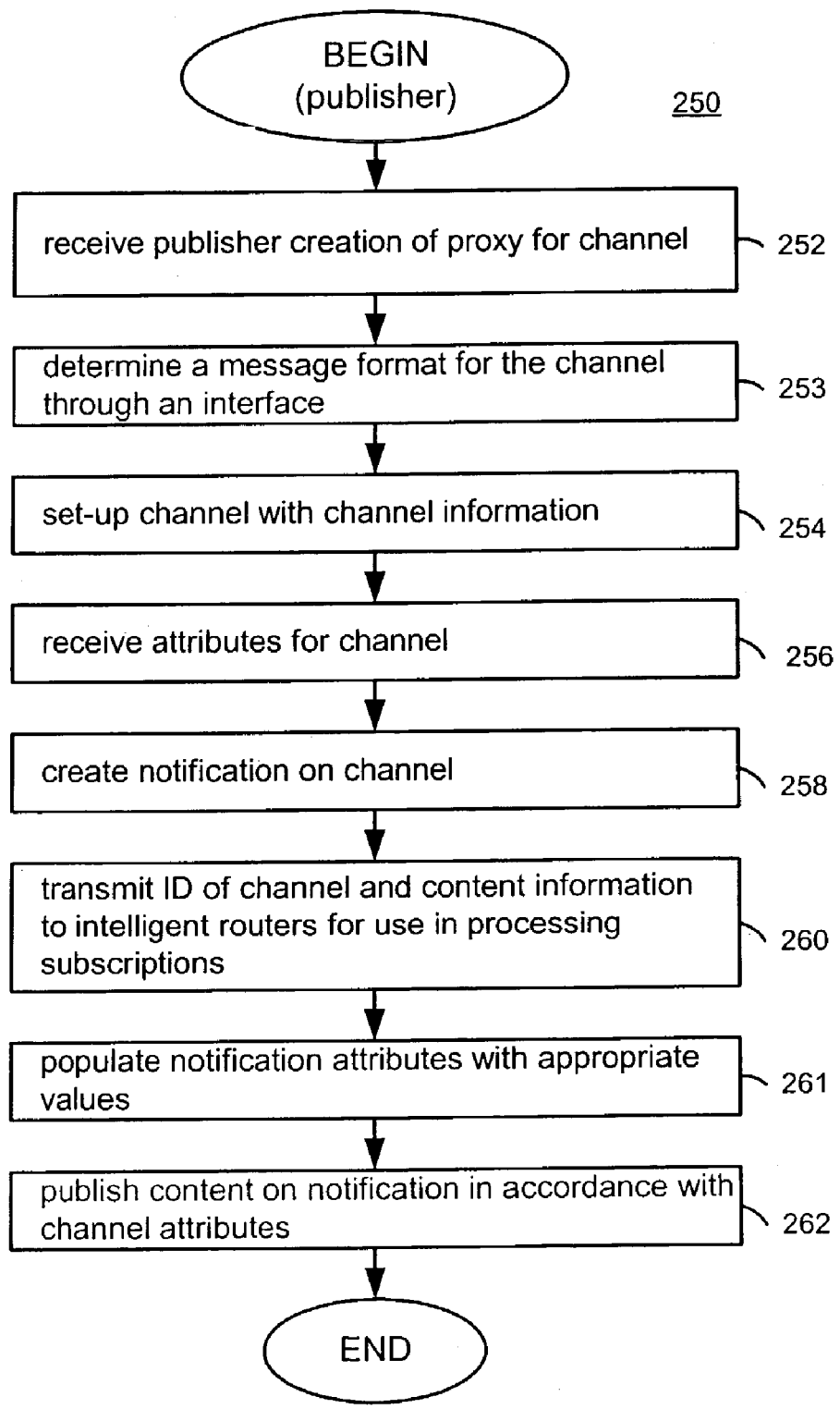
FIG. 10 is a flow chart of a publisher method.

FIG. 10 is a flow chart of an exemplary publisher method 250 for use by a publisher to set-up a channel and publish content. Method 250 can be implemented, for example, in software modules including agent 106 for execution by processor 114 in publisher machine 100. In method 150, agent 106 in the publisher machine receives a publisher creation of a proxy for a channel (step 252). The proxy provides for communication with the network. Agent 106 determines a message format for the channel through an interface (step 253), and the format information can be obtained from, for example, the channel managers or other entities in the network. Agent 106 sets up the proxy for the channel using the received channel information (step 254), which includes receiving attributes for the channel (step 256) and creating a notification on the channel (step 258). The notification provides content for devices "listening" for content on the channel. The attributes define parameters and characteristics for the notification.

Agent 106 transmits an identifier (ID) of the channel and content information to intelligent routers in the network core or elsewhere for use in processing subscriptions (step 260). The publisher populates the notification attributes with appropriate values (step 261), and the publisher can then publish content on notification in accordance with the channel attributes (step 262). Steps 260-262 in this example accomplish publishing the notification, which can alternatively involve different or additional steps depending upon a particular implementation. Therefore, the information associated with a notification in this example is partitioned into an ordered sequence of attributes, each of which has a name, a position within the notification (starting at 1), a type, and a value. Alternatively, attributes can have different characteristics depending upon a particular implementation. Attributes can include, for example, predefined attributes, discretionary attributes, or both.

The intelligent routers can use the channel ID in a packet to obtain the attributes for the corresponding channel, which determines the structure or format for packets transmitted via the channel. In particular, each packet can contain, for example, a tag associated with a channel ID and other header information such as a publisher ID and subjects. The tags can be used to map subjects to numbers in the message format, an example of which is shown in FIG. 18. Small integer values, for example sixteen bit values, can be used for the numbers, Alternatively, any other type of numbers or information can be used to map the subjects. Mapping subjects to numbers can provide particular advantages; for example, it can save space in the message format and provide a uniform or standard way to specify indications of the subjects in the message so that they can be quickly located and identified. Intelligent routers can locally store the mapping or, alternatively, use the numbers to remotely obtain the corresponding subject through a command.

Table 10 illustrates a structure for mapping numbers to subjects, in this example using integer values. The subject tree parameter in the table indicates that a subject can include one or more subject fields in an hierarchical relationship; for example, a subject tree can include a string of subject fields demarcated by particular symbols. Examples of subject trees are provided in Table 2. As an example, a subject tree quotes.nyse includes a subject "quotes" and a sub-field "nyse" with those two terms demarcates by a "." as found in URLs or other network addresses. Aside from using periods and specifying URL-type strings, subject trees can be specified in any way using any characters and symbols for demarcation.

TABLE 10

| Number | Subject Tree |
| --- | --- |
| integer value 1 | subject tree 1 |
| integer value 2 | subject tree 2 |
| ... | |
| integer value N | subject tree N |

Thus, knowing the packet format or structure for a particular channel, the intelligent routers can quickly locate subjects and attributes, or other information, in the packet for content-based routing. For example, a channel can specify byte positions of subjects and attributes transmitted over the channel, making them easy to locate by counting bytes in the packet. Alternatively, intelligent routers can parse packets to locate subjects and attributes, or other information.

Table 11 provides an example of a publisher program in the C++ programming language. Table 12 provides an example of an API to create a channel. Table 13 provides an example of a channel configuration file maintained by a channel manager (see FIG. 6) and providing channel-related information, as illustrated. The system can alternatively have a global channel manager providing IP addresses of geographically dispersed servers functioning as local channel managers in order to distribute the processing load.

TABLE 11

Example of Publisher Program

```
#include "PC_evn_Notification.h"
#include "PC_evn_Proxy.h"
using namespace precache::event;
int main(int argc, char argv[])
{
    PC_UINT QuotesRUs = myChannelofInterest; // channel ID
    PC_UINT myID = myPublisherID; // publisher ID
    try {
        Proxy p(QuotesRUs, myID);
        Notification n1(p, "quotes.nyse");
        n1.SetPredefinedAttr("symbol", "LUS");
        n1.SetPredefinedAttr(price", 95.73);
        p.Publish(n1);
        Notification n2(p, "quotes.nyse");
        n2.SetPredefinedAttr(1, "SNE");    // attribute symbol is in position 1
        n2.SetPredefinedAttr(2, 80.18);    // attribute price is in position 2
        p.Publish(n2);
    }
    catch (InvalidChannelException icex) {
        cerr << "bad channel" << endl;
    }
    catch InvalidSubjectException isex) {
    }
    catch (InvalidNotificationException inex) {
        cerr << "bad notification" << endl;
    }
    catch (Exception ex) {
        cerr << "unknown error" << endl;
    }
}
```

TABLE 12

Example of API to Create a Channel

```
PC_Status rc;
rc = PC_chn_create(Provider_info, authinfo, ConfigurationFile, &hChannel);
/* the first one primary channel manager */
rc = PC_chn_addChannelManager (hChannel, "10.0.1.1");
/* secondary channel manager */
```

TABLE 12-continued

Example of API to Create a Channel

```
rc = PC_chn_addChannelManager (hChannel, "10.0.2.2");
*/
rc = PC_chn_setProperties (hChannel, ConfigurationFile);
/*
Set the message type (only in fixed part of the message)
by using rc = PC_chn_setAttributeType(hChannel, name, position, attributeType).
The type information is propagated to all edge routers.
*/
rc = PC_chn_setAttributeType(hChannel,"Priority",1,PC_UINT 16_TYPE);
rc = PC_chn_setAttributeType(hChannel,"Alarm_Name",2,PC_STRING_TYPE);
rc = PC_chn_setAttributeType(hChannel,"Alarm_Time",3,PC_INT32_TYPE);
rc = PC_chn_updateAttribute(hChannel);
rc = PC_chn_close(hChannel); /* finish channel creation */
```

TABLE 13

Example of a Channel Configuration File

```
# Channel Setup - Read by Channel API, event and messaging
# Each channel entry information is tagged with the
# type of information e.g.
# [ChannelComm 5] for Channel 5 Communication related information
# [ChannelSubjects 5] for subject related information in channel 5
# [ChannelAttributes 5] for attribute information in channel 5

# The Channel id is appended to the tag to indicate
# the channel that the information belongs to
# e.g. [ChannelComm 5] indicates routing information
# for channel 5.

# All the fields need not be set. For example if
# running with the central server, the MulticastIP is
# not needed.
[ChannelComm 5]
MulticastIP=225.0.0.1
RouterIP=test3
RouterPort=12345
ProxyPort=9015
ProxyCtrlPort=9016
[ChannelSubjects 5]
NumberOfSubjects=2
subject1=#.SUBSCRIPTION
mapping1=0.100
subject2=Quotes.Nyse
mapping2=102.101
[ChannelAttributes 5]
NumberOfAttributes=4
name1=StockId
type1=PC_UINT_TYPE
name2=Company
type2=PC_CHARARRAY_TYPE
name3=Price
type3=PC_FLOAT_TYPE
name4=Volume
type4=PC_UINT_TYPE
```

Figure 11:
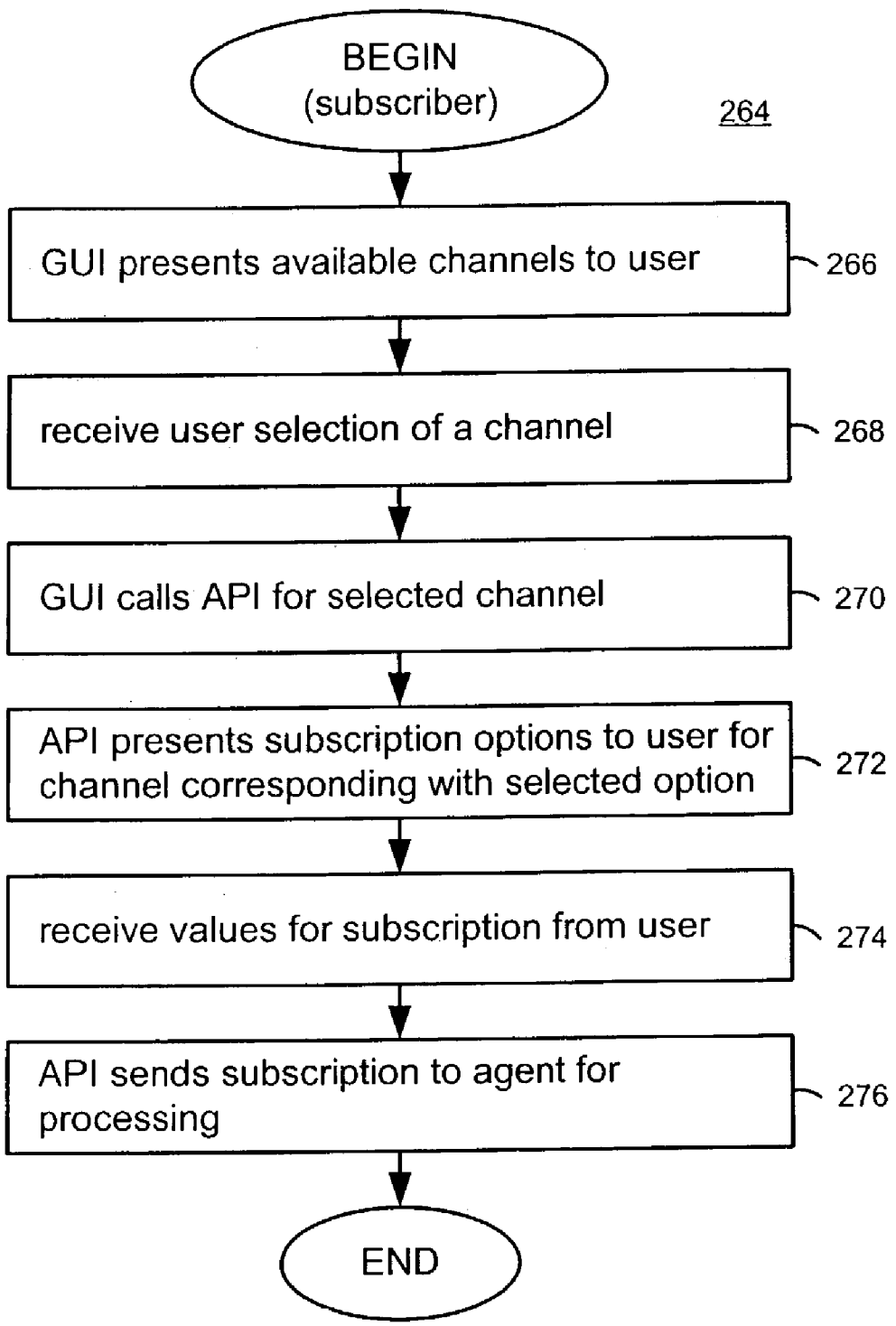
FIG. 11 is a flow chart of a subscriber method.

FIG. 11 is a flow chart of a subscriber method 264 for use in receiving and processing subscriptions. Method 266 can be implemented, for example, in software modules including agent 128 for execution by processor 134 in subscriber machine 122. In method 264, a graphical user interface (GUI), for example, presents an indication of available channels to a user (step 266), which can be accomplished by application 126. The information identifying the channels can be received from, for example, the channel managers providing channel-related information. Any type of application 126 can be used for presenting identifications of channels in any particular way or format. The application receives a user's selection of a channel (step 268) and calls an API or other program for the selected channel (step 270). The API presents subscription options to the user for the channel corresponding with the selected option (step 272). The API receives values for the subscription from the user (step 274) and sends the subscription to agent 128 for processing, as explained below (step 276).

The parameters for the subscription can include, for example, the predicates as illustrated in Table 1. Each channel can use its own API, for example, in order to process subscriptions according to the particular requirements or parameters for the corresponding channel. These APIs can include, for example, web-based or Java-based APIs for receiving subscriptions and can use any type of user interface and processing to receive information for a subscription and pass it along to the agent application.

Figure 12:
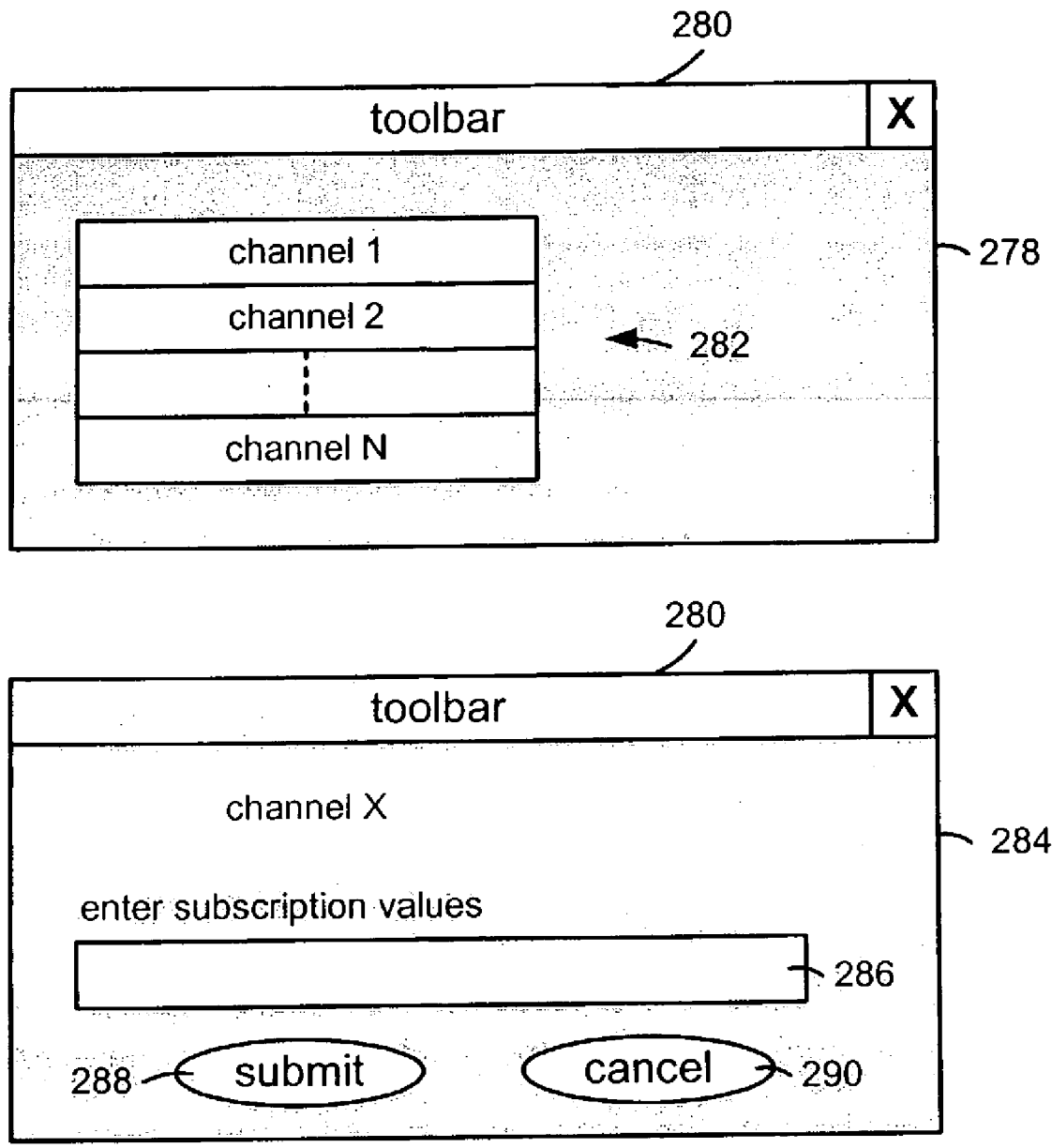
FIG. 12 is a diagram of channel and subscriber screens.

FIG. 12 is a diagram conceptually illustrating channel and subscriber screens or GUIs 278 and 284, which can be used in conjunction with method 264 for receiving a subscription. Screen 278 includes a plurality of sections 282 identifying available channels for selection by a user. Upon selection of a particular channel, screen 284 can be displayed for receiving a user's values for the subscription in a section 286. A user can select a section 288 to submit the subscription or select a section 290 to cancel the subscription. Screens 278 and 284 can be formatted as, for example, HyperText Markup Language (HTML) web pages or in any other format. Also, the screens can include any configuration of sections and content, possibly including, for example, text, graphics, pictures, various colors, or multi-media information in order to provide, as desired, a user-friendly and visually appealing interface for subscribers. The screens can also include a toolbar 280 providing, for example, conventional browser functions.

Table 14 provides an example of a subscriber program in the C++ programming language.

TABLE 14

Example of Subscriber Program

```
#include <unistd.h>
#include <iostream>
```

TABLE 14-continued

Example of Subscriber Program

```
#include "PC_evn_Filter.h"
#include "PC_evn_Subscription.h"
#include "PC_evn_Proxy.h"
using namespace precache::event;
class SubscriberApp : public Subscriber
{
private":
    PC_UINT notificationCount = 0;
public:
    SubscriberApp( ) {} // default constructor
    void run( )
    {
        PC_UINT QuotesRUs = myChannelofInterest; // channel ID
        PC_UINT myID = myPublisherID;            // publisher ID
        try {
            Proxy           p(QuotesRUs, myID);
            FilterFactory*  factory = FilterFactory::GetFilterFactory( );
            Filter*         f = factory->CreateFilter(p, "symbol == \"LU\"");
            PC_INT          c1 = 0;
            SubscriptionHandle sh = p.Subscribe("quotes.nyse", f, this,
                                                (void*)&c1);
            while (notificationCount < 2) {     //let notify( ) get some
                                                // notifications
                sleep(5);
            }
            p.Unsubscribe(sh);
        }
        catch (InvalidChannelException icex) {
            cerr << "bad channel" << endl;
        }
        catch (InvalidSubjectException isex) {
            cerr << "bad subject" << endl;
        }
        catch (InvalidChannelException ifex) {
            cerr << "bad filter" << endl;
        }
        catch (InvalidSubscriptionHandleException ishex) {
            cerr << "bas subscription handle" << endl;
        }
        catch (Exception ex) {
            cerr << "unknown error" << endl;
        }
    }
    void Notify(Notification* n, void* c)   //this is the callback method
    {
        if(*(PC_INT*)c == 0){//check the closure object
            PC_STRING symbol;
            PC_FLOAT price;
            n->GetPredefinedAttr("symbol", symbol);
            n->GetPredefinedAttr("price", price);
            cout << "The price of" << symbol << "is" << price << endl;
            notificationCount++;
        }
    }
};
int main(int argc, char argv[])
{
    SubscriberApp a;
    a.run( );
}
```

Content-based Routing Via Payload Inspection and Channels

Figure 13:
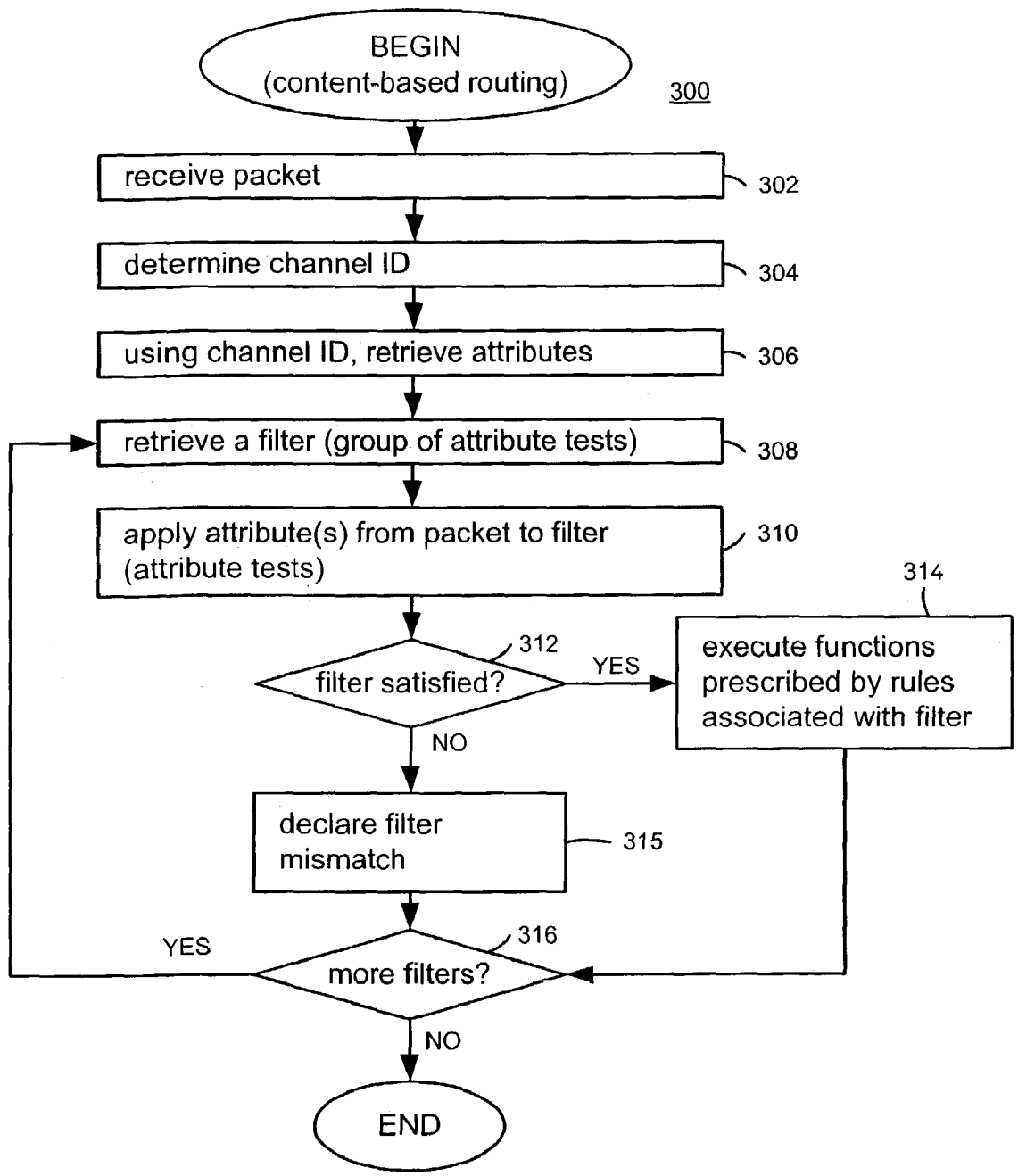
FIG. 13 is a flow chart of a content-based routing method.

FIG. 13 is a flow chart of a content-based routing via payload inspection method 300. Method 300 can be implemented, for example, in software modules for execution by processor 93 in intelligent router 92, as represented by filtering daemon 212. Alternatively, it can be implemented in an ASIC or a combination of hardware and software. The content-based routing as illustrated in method 300 can be performed in intelligent routers anywhere in the network, such as in the network core or in edge routers.

In a general sense, the content-based routing involves inspecting a payload section of a packet in order to determine how to process the packet. This content-based routing methodology can include, for example, processing a list of subscriptions (using filters, for example) in any order, comparing a message subject-by-subject and attribute-by-attribute with routing rules to determine a routing for the message, and performing the processing in a network core. The rules can include rules governing in-router processing or any rules associated with a filter. These routing decisions can thus be distributed throughout a network core. The use of subjects as represented by channels determines a message format, thus providing an intelligent router with a way of quickly locating attributes within the message, for example by knowing their byte positions in the message or packet for a particular channel.

In method 300, intelligent router 92 receives a packet for a message (step 302). It determines from the packet a channel ID for the corresponding message (step 304) and retrieves attributes for the channel using the channel ID (step 306). In this example, the type of channel (determined from the channel ID) determines locations and data types of attributes in the packet. The attributes for the channel can be locally stored or retrieved remotely such as via a channel manager. Intelligent router 92 retrieves a filter, which corresponds with a subscription (step 308). The filter includes one or more attribute tests, usually a group of attribute tests for subscriptions. Intelligent router 92 applies attributes in the packet to the corresponding attribute test(s) in the filter description (step 310).

If all the attribute test(s) in the filter description produce a positive result (step 312), meaning the attributes satisfy all the attribute test(s), the intelligent router executes a set of functions prescribed by the rules associated with the filter (step 314). These functions can include, for example, routing the packet to the next link, and/or performing some action or computation with the content of the packet at the local router as prescribed by the rule(s). The action or next link can be identified, for example, in a data structure specifying the corresponding subscription. When the rule is a link, it typically identifies the next network node to receive the packet, which can include an intelligent router, backbone router, a network-connected device, or other entity. Alternatively, the next links can be specified or associated with the subscriptions in other ways.

If all the attribute test(s) in the filter description did not produce a positive result (step 312), meaning the attributes do not satisfy all the attribute test(s), the filter is declared a mismatch (step 315). The intelligent router recursively follows the above procedure until all the attribute tests in the filter description are exhausted or a first negative result is encountered, whichever comes first.

Once all the attribute tests have been processed for this filter, the intelligent router determines if more filters exist (step 316) and, if so, it returns to step 308 to retrieve the attribute test(s) for the next filter to process the attributes for it. The matching procedure (steps 308, 310, 312, 314, 315, and 316) continues until either the complete set of filters is exhausted, or results for all the action or routing rules can be determined, whichever comes first. If the packet does not satisfy any filter, it will be dropped (discarded) and not forwarded.

Intelligent router 92 can sequence through the filters in any particular order. For example, as illustrated in Table 15, intelligent router can store the filters for subscriptions in a file or routing table and linearly sequence through them to apply the attributes to filters (attribute tests). Alternatively, the routing table can include links or pointers to the filters.

The content-based routing can optionally use more than one method at the same time, depending on the applications and performance-enhancing heuristics such as the switching of algorithms based on traffic conditions, for example. The filters for the processing can optionally be encrypted, decrypted, transformed, and merged at a router in the network for use in performing inspecting of a payload section for the content-based routing. For example, a subscription such as price>$3.54122 may be truncated to price>$3.54 because the publications in the application are known not to contain currency attributes beyond the second decimal points. Also, foreign currency may be translated into U.S. currencies as well when a publication sent from overseas reaches the first router located in the U.S., for example.

As an alternative to a linear approach, intelligent router 92 can select filters for processing in other orders or according to various algorithms that can possibly enhance the speed and efficiency of processing. Table 16 provides examples of subscriptions and corresponding links for them; in these examples, the subjects relate to a particular channel and the subscriptions for the subjects can be represented by routing rules for the filters. The subjects can include, for example, network addresses such as Uniform Resource Locators (URLs) identifying a source of content.

TABLE 15

| Subscriptions | Links |
|---|---|
| Channel 1 | |
| filter 1a | links 1a |
| filter 2a | links 2a |
| ... | ... |
| filter Na | links na |
| ... | |
| Channel N | |
| filter 1N | links 1a |
| filter 2N | links 1b |
| ... | ... |
| filter NN | links 1n |

TABLE 16

Caching at Network Nodes

| Content Predicate | Links |
|---|---|
| sub = "quote.optimist" & <br> ( ($1 > 5 & $2 = "LU") <br> \| ($1 > 30 & $2 = "T") ) | x10, x11 |
| ( sub = "sony.music" \| sub = "sony.movie" ) <br> & $1 > 30 & $4 = "Beethoven" | x11, x13 |
| sub = "movie.ratings" & <br> ($1 > 1999 \| $2 = "Kurosawa") & $3 = "*" | x11, s15 |

Figure 14:
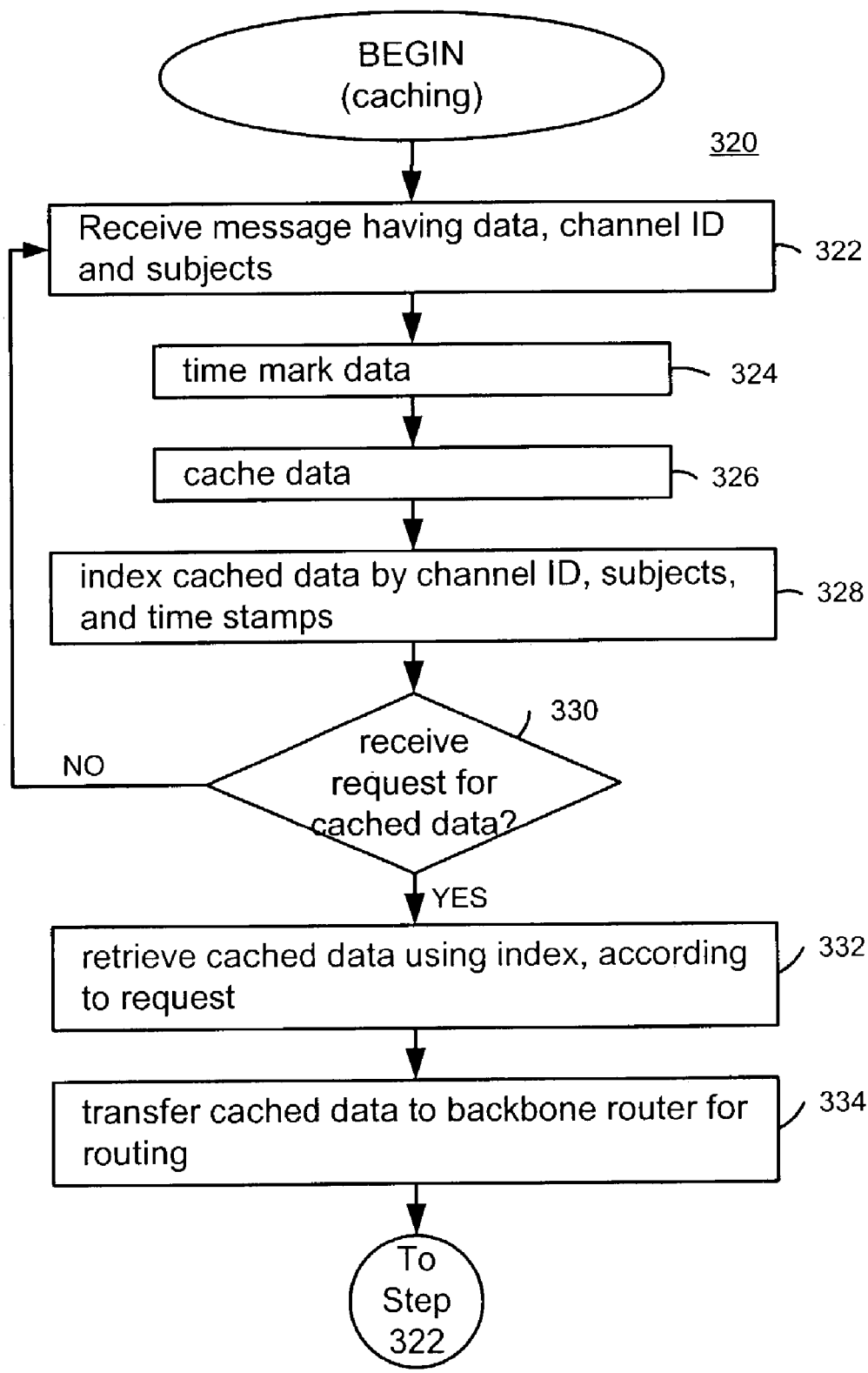
FIG. 14 is a flow chart of a caching method.

FIG. 14 is a flow chart of a caching method 320. Method 320 can be implemented, for example, in software modules for execution by processor 93 in intelligent router 92, as represented by cache manager 218. Alternatively, it can be implemented in an ASIC or a combination of hardware and software, either in the same or different physical device as the corresponding intelligent router. In method 320, intelligent router 92 receives a message having data or content, a channel ID, and subjects (step 322). Intelligent router 92 time marks the data (step 324) and locally caches it such as in memory 94 or secondary storage 97 (step 326). It indexes the cached data by, for example, channel ID, subjects, and time stamps (step 328).

If intelligent router 92 receives a request for data (step 330), it retrieves cached data, using the index, according to the request (step 332). Intelligent router 92 transfers the cached data to backbone router 95 or other routing entity for eventual transmission to the requestor or others. Method 320 can be repeatedly executed in order to continually cache data and retrieve cache data in response to requests.

Figure 15:
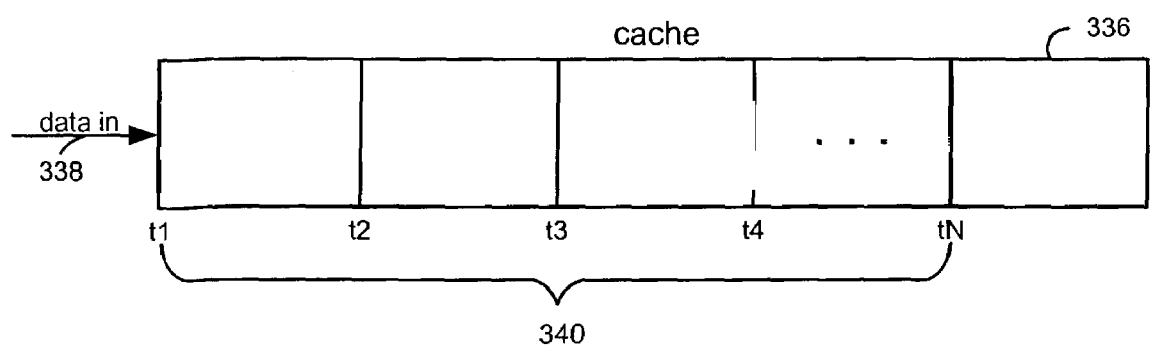
FIG. 15 is a diagram illustrating a cache index.

FIG. 15 is a diagram illustrating a cache index (336) for use with method 320. Cache index (336) receives data (338) and stores it with time stamps (340). As data is gathered, it is marked upon every duration of delta t, where delta t represents the time between marks, for example $t_2-t_1$. Other types of indexes for time marking in any way can alternatively be used.

Table 17 conceptually illustrates indexing of cached data. Table 18 conceptually illustrates a data structure for storing a connection history for caching. Table 19 provides examples of data structures for use in locally caching data in network nodes having intelligent routers.

The time marking can occur at any fixed or variable interval. For example, data can be cached and indexed every five minutes. Upon receiving a command to retrieve cached data (such as #.getCache) specifying a time and subject, cache manager 218 uses the cache index to determine if it can retrieve cached data corresponding with the request for step 332.

Each subject or channel can include, for example, its own IP address in a multicast tree and a set of intelligent routers. Therefore, Table 18 represents a connection history among such routers that can be locally stored a user machine; if an edge router fails, the machine can access the connection history to determine how to reconnect with upstream routers for the channel when the edge router comes back on-line. It can also execute a get cache command for the duration of the time that it was disconnected in order to obtain any pending content for subscriptions, for example.

TABLE 17

| | | | |
|---|---|---|---|
| $t_1$ | channel ID 1 | subjects 1-n | pointer 1 to cached data |
| $t_2$ | channel ID 2 | subjects 1-n | pointer 2 to cached data |
| $t_n$ | channel ID N | subjects 1-n | pointer N to cached data |

TABLE 18

Connection History

| time | router | network addresses | |
|---|---|---|---|
| $t_1$ | R2 | UR2 | UR3 |
| $t_2$ | R2 | UR2 | UR3 |
| ... | | | |

TABLE 19

Examples of Cache Data Structures for Intelligent Router

Channel Node

```
Struct ChannelNode {
    PC_UINT         unChanId;
    PC_AttributeInfo *pAttrinfo;
    PC_BOOL         bPersistent; /* Persistent or RT*/
    PC_UINT         unTimeout;
    PC_UINT         unTimeGranularity;/* in minutes */
    PC_INT          nDirFd;
    HashTable       *pFirstLevelSubjs;
}
```

Subject Node

```
Struct SubjectNode {
    PC_USHORT       unSubjectId;
    PC_UINT         unSubjLevel;
    Void            pParent; /* Channel or Subject */
    PC_INT          nDirFd;
    HashTable       *pNextLevelSubjs;
    DataNode        *pData;
}
```

TABLE 19-continued

Examples of Cache Data Structures for Intelligent Router

Data Node

```
Struct DataNode {
    PC_INT          nDirFd;
    SubjectNode     *pParent;
    LastTimeGrainNode *pLastTGrainData;
    DLIST           *pStoredData;/*list StoredTimeGrainNode */
    PC_Mutex        mStoredDataLock;
}
```

Stored Time Grain Node

```
Struct StoredTimeGrainNode {
    PC_UINT         unStartTime; /* in minutes */ChanId;
    PC_UINT         unEndTime; /* in minutes */
    PC_INT          nFd;
}
```

Last Time Grain Node

```
Struct LastTimeGrainNode {
    PC_CHAR         pLastTGrainData; /* could be a list */
    PC_UINT         unLastTGrainStartTime;
    PC_BOOL         bReadyToStore;
    PC_Mutex        mCachedDataLock;
}
```

These exemplary data structures include the following information. A subject node contains a subject identifier, subject level, pointer to parent channel or subject node, file descriptor for its own directory, pointer to hash table containing its next level subject nodes, and pointer to a data node. A data node contains a pointer to its subject parent node, file descriptor for the data directory, circular buffer containing the data structures for the data stored on each storage device, head and tail of the buffer, and lock for locking the data node during retrieval and storage. The stored time grain node is the node representing the actual data file, and the last time grain node represents the last buffer that has not yet been stored to the storage device but is maintained in memory. The caching and data storage threads in this example use the mutex of the last time grain node for preventing concurrent access to the last time grain node.

Agent Processing

Figure 16:
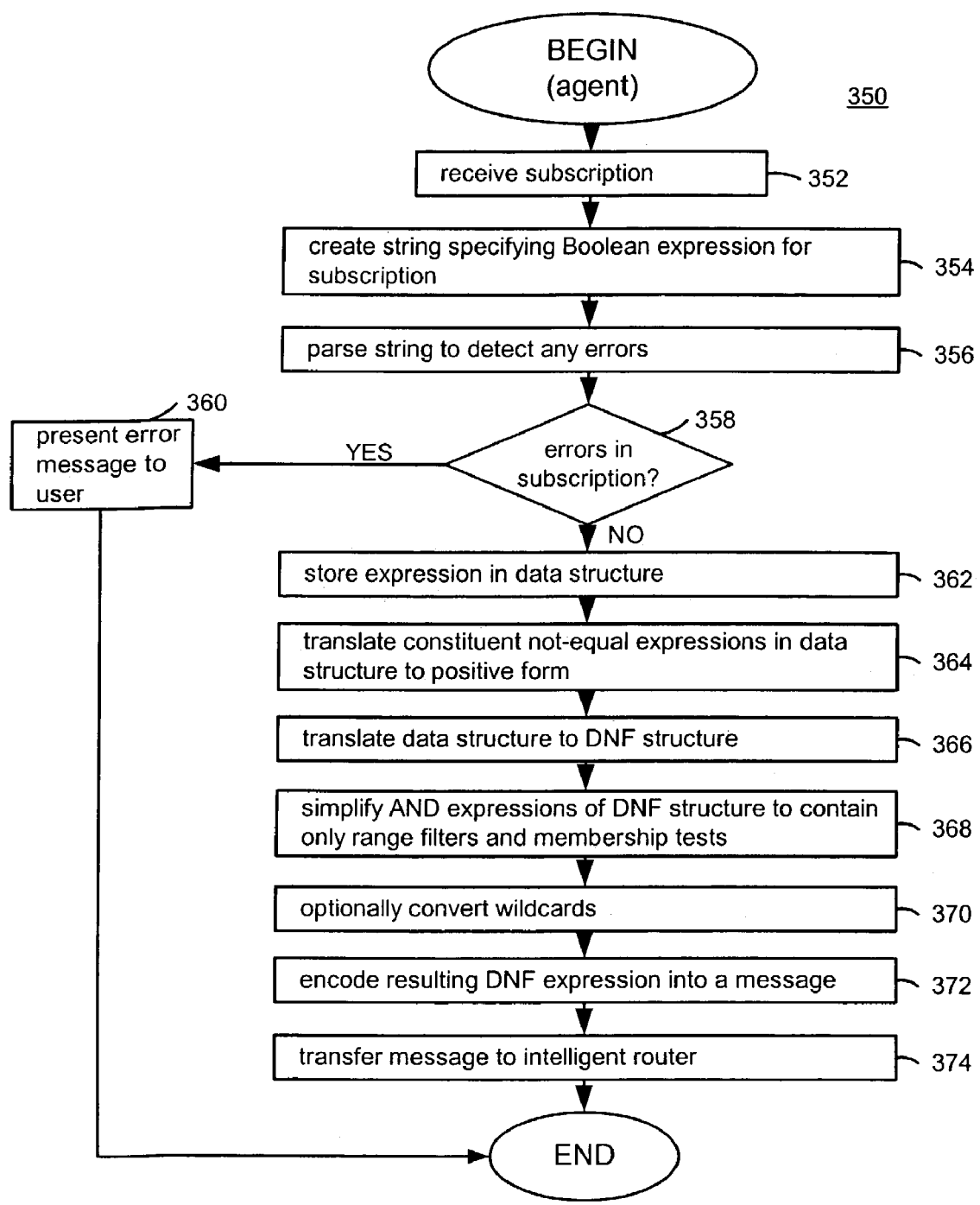
FIG. 16 is a flow chart of an agent method for an outgoing message.

FIG. 16 is a flow chart of an agent method 350 for an outgoing subscription message. Method 350 can be implemented, for example, in software modules as represented by agent 128 for execution by processor 134 in user (subscriber) machine 122. In method 350, agent 128 receives a subscription such as via the method described above in FIGS. 11 and 12 (step 352). Agent 128 creates a string specifying a Boolean expression for the subscription (step 354) and parses the string to detect any errors in the subscription (step 356). If an error exists, agent 128 can present an error message to the user (step 360) in order for the user to correct the error and re-enter the subscription. If the subscription contains no errors (step 358), agent 128 stores the expression in a data structure, an example of which is provided below (step 362). Agent 128 translates constituent not-equal expressions in the data structure to positive form (step 364) and translates the data structure to a corresponding disjunctive normal form (DNF) structure (step 366). Agent 128 also simplifies AND expressions of the DNF structure to contain only range filters and membership tests (step 368).

The DNF is a well-known canonical form in which a Boolean expression is represented as an OR of one or more sub-expressions called disjuncts, each sub-expression being an AND of one or more attribute tests. For example, the Boolean expression (price>=10 AND (symbol=="LU" OR symbol=="T")) has an equivalent DNF representation of ((price>=10 AND symbol=="LU") OR (price>=10 AND symbol=="T")).

The transformation in step 364 involves translating expressions having the "not-equal" operator (represented in an exemplary syntax as !=) into an equivalent "positive" form that specifies all allowed values rather than the one disallowed value. This transformation is performed prior to creation of the DNF, and it is needed because the routers in this example require formulae to be in positive form. For example, the expression (price!=80) can be transformed to the equivalent positive expression (price<=79 OR price>=81).

The transformation in step 368 is performed after the DNF is created and involves an extra simplification of the resulting AND expressions, and it is also performed to simplify the work of the routers in this example. In particular, an AND of multiple attribute tests for the same attribute can be simplified into a canonical "range filter" having either one lower bound, one upper bound, both a lower and upper bound, or a single value in the case of an equality test. The particular kind of range filter is then encoded according to Table 22.

For example, the expression (price>=10 AND price<=80 AND price>=20 AND price<=100) can be simplified to the expression (price>=20 AND price<=80), which is an example of a range filter with both a lower and an upper bound. Examples of the other kinds after simplification are the following: (price>=20) (lower bound only); (price<=80) (upper bound only); and (price==50) (single value). In creating these range filters, it is possible that some sub-expression will simplify to true or to false, in which case the sub-expression can be eliminated according to the laws of Boolean algebra, thereby further optimizing the encoding of the expression in a message. For example, the expression (price>=50 AND price<=20) simplifies to false, since no value for "price" can satisfy the expression. In the special case in which a whole filter expression simplifies to false, the agent need not create a message at all, thereby relieving the router of unnecessary work.

If the subject filter contains wildcards, agent 128 can optionally convert them as explained below (step 370). Otherwise, any wildcards can be converted in the network, rather than on the user machine or other device. In this exemplary embodiment, the syntax for subject filters is the only syntax that uses wildcards, and the syntax for attribute filters is the only syntax that uses Boolean expressions. Alternatively, implementations can use different or varying types of syntax for subject filters and attribute filters.

Agent 128 encodes the resulting DNF expression into a message (step 372) and transfers the message to an intelligent router (step 374). The encoding can involve converting the subscription to a flat message format, meaning that it constitutes a string of data. This transferring can involve propagating routing rules generated from subject filters and attribute filters for the subscription to one or more intelligent routers or other routing entities in the network. For the propagation, the subscription expression can be mapped into a conventional packet structure, for example.

The encoding for step 372 involves marshalling subscriptions for a channel into a messaging format of the messaging API for propagation throughout a channel. A subscription is internally messaged, for example, as a notification with subject #.SUBSCRIPTION. Because there are both a variable number of subject filter fields and a variable number of attribute tests, one pair of bytes is used to store the number of subject filter fields, and another pair of bytes is used to store the number of attribute tests in this example. The individual fields of the subject filter are marshaled sequentially, for example, in the order in which they were specified in the original subscription and are each marshaled into a two-byte portion of the message. Wildcard fields can be marshaled as described below.

In marshaling the attribute tests, the operands of the tests are marshaled at the end of the message in a manner similar to the marshaling of attribute values of notifications. Prior to marshaling the attribute tests and operands, they are sorted by attribute order within each disjunct of the DNF with tests on predefined attributes in position order, followed by tests on discretionary attributes in name order. Furthermore, the set of relational tests on scalar valued attributes within each disjunct are simplified to a canonical form as range filters having either one limit (for left- or right-open ranges or equality tests) or two limits (for closed ranges between distinct limits). The remaining information about the tests is encoded into, for example, two-byte pairs in the same order as the operands; this sequence of two-byte pairs is placed in the message immediately following the sequence of two-byte encoding of subject filter fields. The two-byte pairs can constitute one form of a sequence of bit-string encodings of attribute tests, which can also be used to represent other types of encodings aside from two-byte pairs. Examples of attribute tests are provided below.

The schema for the encoding of the attribute tests is depicted in Table 20. Table 21 illustrates encoding for the two-byte pairs, and Table 22 illustrates encoding of the Operator ID in the two-byte pairs.

TABLE 20

Encoding Rules

1 A zero in the D bit indicates the beginning of a new disjunct in the DNF, while a one in the D bit indicates an additional conjunct within the current disjunct.
2 A value other than all ones in the Notification Attribute Position indicates the position of a predefined attribute (as defined by the channel's notification type) to which the test applies; the operand for the test is marshaled as depicted in the example shown in FIG. 18.
3 A value of all ones in the Notification Attribute Position indicates that the test applies to a discretionary attribute, in which case the name length and name of the attribute to which the test applies are marshaled with the operand.
4 The bits for the Operand Type ID encode one of the predefined types for attributes.
5 The bits for the Operator ID encode the operator used in the test, as defined in Table 22.

TABLE 21

| First Byte | | | | | | | |
|---|---|---|---|---|---|---|---|
| 0 | 1 | 2 | 3 | 4 | 5 | 6 | 7 |
| D | Notification Attribute Position | | | | | | |

| Second Byte | | | | | | | |
|---|---|---|---|---|---|---|---|
| 0 | 1 | 2 | 3 | 4 | 5 | 6 | 7 |
| Operand Type ID | | | | | Operator ID | | |

TABLE 22

| Operator | Operator ID |
| --- | --- |
| Left-open range | 000 |
| Right-open range | 001 |
| Closed-range | 010 |
| Equality test | 011 |
| Positive membership test (in) | 100 |
| Negative membership test (not in) | 101 |

Because the two-byte pair for a test already indicates both the type of the operand of the test and whether or not the test applies to a predefined or discretionary attribute, there is no need to separately marshal the number of tests performed on discretionary attributes or their types. This scheme assumes there are no more than 127 predefined attributes in a notification. Alternatively, this design may use more bits to encode attribute tests.

While this marshaling convention orders and groups attribute tests according to the DNF of the attribute filter, an infrastructure element (such as a router) may choose to evaluate the tests in some other order (perhaps according to dynamically derived local data about the probability of success or failure of the different tests) in order to make the overall evaluation of the attribute filter more efficient. The Subscription ID field of the message is a value generated by the agent for uniquely identifying the subscription to the agent's edge router in subsequent requests to modify or unsubscribe the subscription. In particular, a dynamic modification to the attribute filter of a subscription is propagated using the message format shown in the example of FIG. 18, except that the subject is #.RESUBSCRIPTION and the Subscription ID is that of the previously registered subscription being modified. And an unsubscription is propagated using, for example, the message format of FIG. 18 up through the Subscription ID field, with the subject being #.UNSUBSCRIPTION and the Subscription ID being that of the previously registered subscription being unsubscribed.

Figure 19:
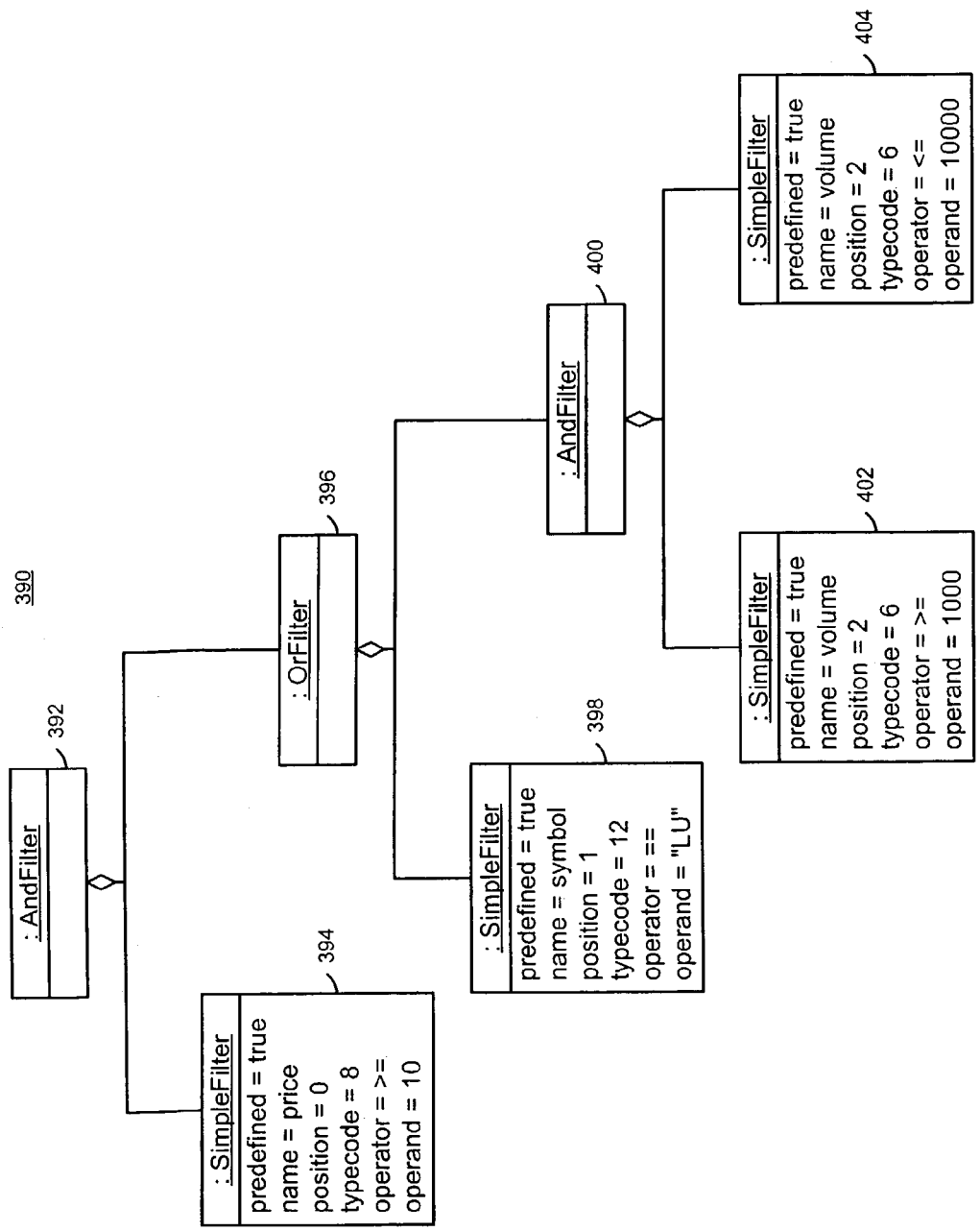
FIG. 19 is a diagram of a database structure for storing subscriptions.

The following provides an example to illustrate the conversion and encoding by the agent as described above. Consider the following example attribute filter expression: price>=10 and (symbol=="LU" or (volume>=1000 and volume<=10000)). FIG. 19 presents a Unified Modeling Language (UML) diagram 390 depicting the objects used by the agent in step 362 to store the expression. This diagram illustrates an hierarchical relationship for specifying the subscription, which can include variables, constant values, or both. The objects in the diagram can be instances of filter classes depending upon a particular implementation. Each SimpleFilter object depicts the values of attributes used to store information about a corresponding attribute test of the filter expression. In the expression of FIG. 19, an OR filter 396 connects two AND filters 392 and 400. The AND filter 392 contains a simple filter 394 with attributes for the subscription. Likewise, the OR filter 396 contains a simple filter 398, and the AND filter 400 contains simple filters 402 and 404.

For the purposes of this example, attributes price, symbol, and volume are assumed to be predefined attributes of the associated channel and are assumed to be defined in positions 0, 1 and 2, respectively. Furthermore, the types of the attributes are assumed to be unsigned integer (typecode 6), character array (typecode 12), and unsigned integer (typecode 6), respectively.

Consider next a subscription containing the above example attribute filter expression as its attribute filter. FIG. 18 presents the marshaling of the subscription into a message. The schematic 386 on the left side of FIG. 18 shows the actual message contents, while the schematic 388 on the right provides a legend for the different parts of the message. The width of each schematic in this example is four bytes. Prior to marshaling, the filter has been converted to its equivalent DNF: (price>=10 and symbol== "LU") or (price>=10 and volume>=1000 and volume<=10000).

The sixteen-bit attribute test encodings are shown as bit sequences, with gaps showing the separation into the different parts. Note that the two tests on price in this example cannot be combined since they are in separate disjuncts, and thus they are marshaled separately as ranges that have no right bound ("right-open ranges"). On the other hand, the two tests on volume can be combined since they are in the same disjunct, and thus they are marshaled together as a single "closed-range" test.

Finally, note also that certain fields are characterized as being "assumed"; this means that values for these fields were chosen arbitrarily for this example and are in general independent of the subscription that was marshaled. In addition, the subject filter for the subscription was arbitrarily chosen to be ">," which matches any subject defined by the associated channel. The example described above and shown in FIGS. 18 and 19 is provided for illustrative purposes only, and the marshalling can be used with any other type of subscription. Also, method 350 provides only one example of marshaling subscriptions, and they can be marshaled in any other way.

Figure 17:
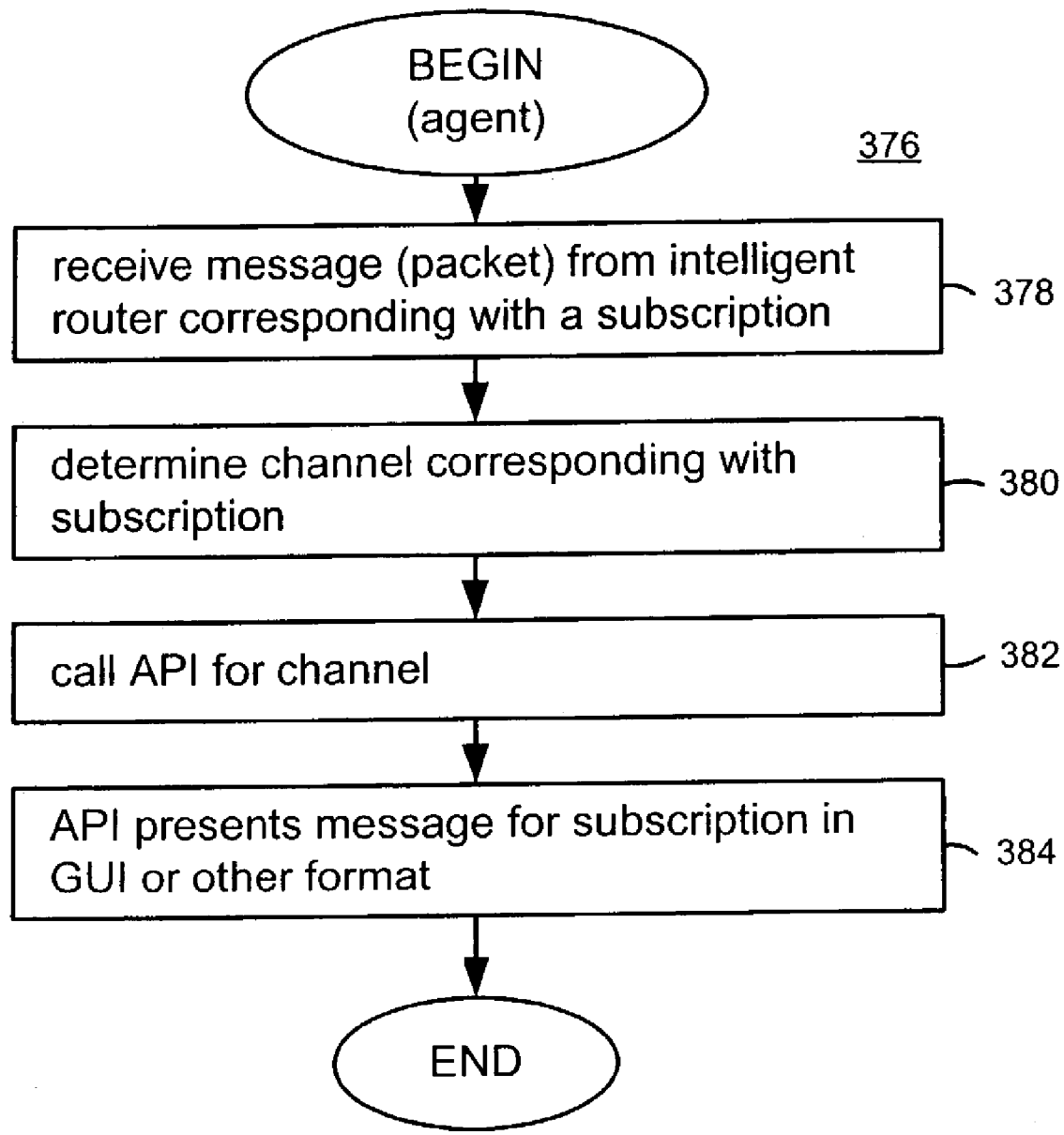
FIG. 17 is a flow chart of an agent method for an incoming message.

FIG. 17 is a flow chart of an agent method 376 for an incoming message. Method 376 can be implemented, for example, by agent 128 and application 126 in user machine 122. In method 376, agent 128 receives a message from an intelligent router corresponding with a subscription (step 378). Agent 128 determines a channel corresponding with the subscription (step 380), for example by the channel ID in the message, and calls an API for the channel (step 382). The API present the data for the subscription in a GUI or other format at the user machine (step 384). The processing of incoming messages can use a process of decoding the data in the reverse of the encoding process described above, and this decoding (reverse encoding) can be performed in a router or in other network entities.

Wildcard Processing

Figure 20:
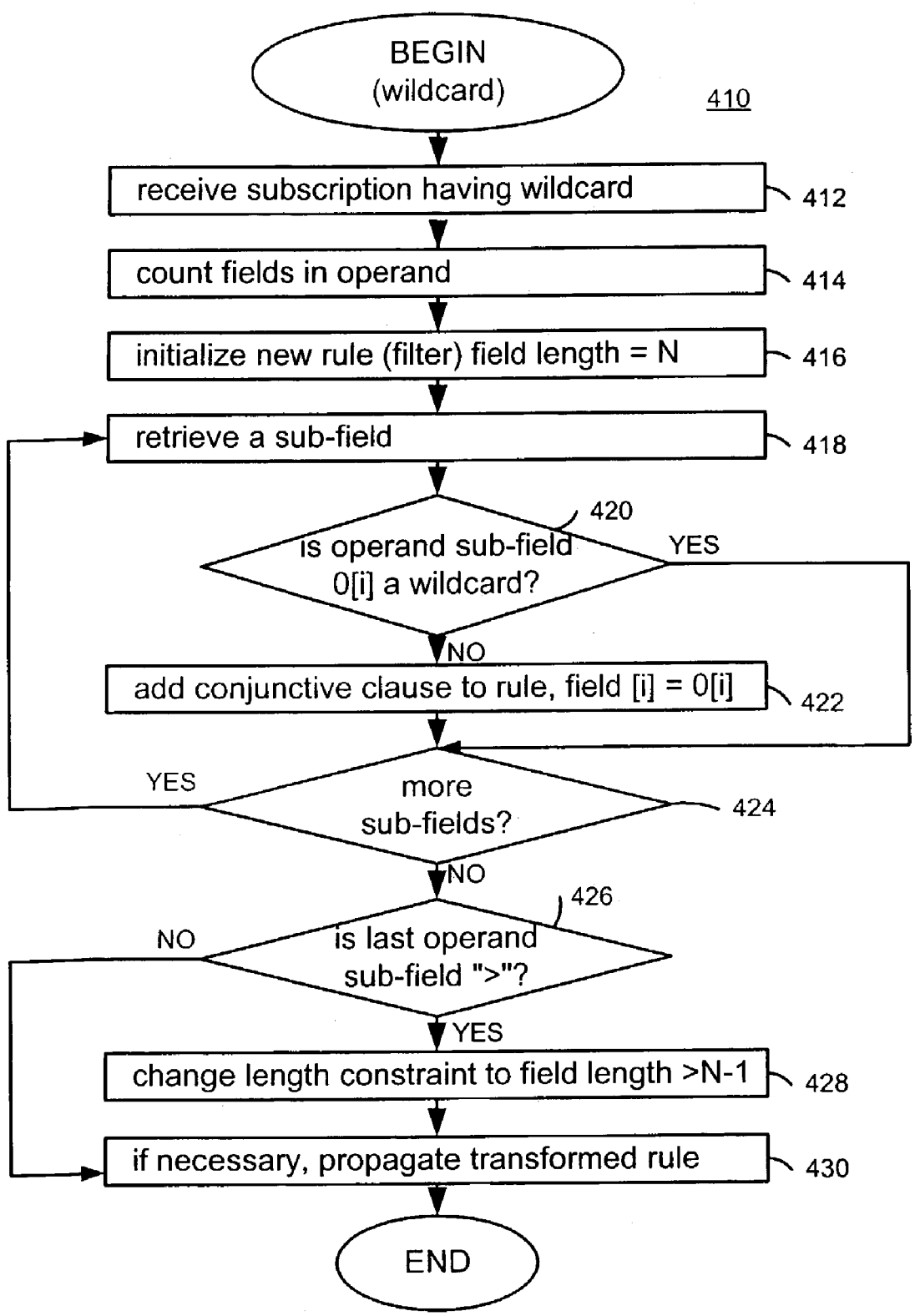
FIG. 20 is a flow chart of a wildcard method.

FIG. 20 is a flow chart of a wildcard method 410. This method illustrates an example of using a set of routing rules for a filter to convert wildcards in expressions for subscriptions. Method 410 can be implemented, for example, in software modules as represented by agent 128 for execution by processor 134 in user machine 122. Alternatively, wildcards can be processed in the network by processor 93 under software control in intelligent router 92 or in the corresponding functions contained in ASIC 91. Wildcards include open fields or variable length fields, examples of which are provided in Table 21.

In method 410, agent 128 or other entity receives a subscription having a wildcard (step 412). The subject length for subscriptions can be specified by a publisher when publishing content, and the subject can be pre-processed on the publisher machine, for example, to count the fields of the subject and thus obtain a field count (length) for it. Agent 128 counts the number of fields in the filter operand (step 414) and initializes a new rule (filter) of field length=N (step

416). Agent 128 retrieves a sub-field for the subscription (step 418) and determines if the filter operand sub-field O[i] is a wildcard (step 420). If the filter operand sub-field is not a wildcard, agent 128 adds a conjunctive clause to the rule, field [i]=O[i] (step 422). If the filter operand has more sub-fields (step 424), agent 128 returns to step 418 to process additional sub-fields. The parameter "i" represents a field where i is an integer representing the field number in this example.

After processing the sub-fields, agent 128 determines if the last filter operand sub-field is a ">" (step 426) and, if so, it changes the length constraint to field length>N−1 (step 428). Wildcard processing can use any type of symbol, and a ">" is only one such example. In this example, a "a.>" can mean a.b, a.c, a.d, etc. and all their sub-subjects at all levels (for example, a.b.x, a.c.x, a.b.x.y, etc.). Other symbols can be used for other implementations of wildcards.

If necessary, agent 128 propagates the transformed rule to intelligent routers or other entities in the network (step 430). Accordingly, the method iterates through the sub-fields in order to process them for conversion of the wildcards to non-wildcard rules, meaning rules that do not contain wildcards. The conversion of wildcards can occur anywhere in the network, for example on the subscriber machine or in an intelligent router. The conversion can thus occur in one entity with the transformed rule propagated to other entities or it can occur dynamically.

Table 23 provides a summary, along with examples, of these exemplary routing rules for processing wildcards. These routing rules can be generated in the intelligent routers, for example, or generated in other network entities and propagated to the intelligent routers. In addition, the routing rules in Table 23 are provided for illustrative purposes only and other routing rules are possible for converting wildcards.

TABLE 23

| Original Rule | Transformed Rule |
| --- | --- |
| subject = "a.b" | subject.length == 2 & subject[0] == "a" & subject[1] == "b" |
| subject = "C.*.D" | subject.length == 3 & subject[0] == "C" & subject[2] == "D" |
| subject = "foo.>" | subject.length > 1 & subject[0] == "foo" |
| subject = "*.*.b.*.c.>" | subject.length > 5 & subject[2] == "b" & subject[4] == "c" |

Persistent and Reliable Massage Delivery

The embodiment described herein provides apparatus and methods for persistent storage of messages and recovery, restart and/or continuation of message flows in the face of network, link and/or node failures in a publish-subscribe network. Message persistence is the ability to store messages and retrieve them at a later time. A large number of specific applications, e.g. email, generally require lengthy message persistence for messages flowing through the network. In ideal conditions, with no failures in the network an always-connected subscriber should not need any persistence beyond that required for these specific applications. However, in reality, messages can get "lost" while traversing through the network due to various reasons—e.g., (1) failures or buffer overflows occurring either inside the network or at the user end or (2) users doing an explicit disconnect from the network and connecting back again after a time period.

The persistence model of an event notification platform of the present embodiment is divided into two levels: short-term persistence and long-term persistence. Short-term persistence is designed for recovering from packet loss due to network congestion or short-term link failure. Long-term persistence is designed for recovering from other failures including, e.g., loss of user connections, failure of user machines, failure of applications, and/or longer-term network failure.

A channel (e.g., as described above) can either be persistent or real-time. A real-time channel transmits data that is generally only useful in real-time and does not have any application-specific persistence requirements. A persistent channel stores data traversing through network for a persistence time frame T. In other words, persistence for a persistent channel is guaranteed for a time frame T. This persistence of data is achieved through the following, for example: caching data at each edge node for the persistent duration of a channel; retrieving data from the cache transparent to the users under failure conditions; allowing the user to explicitly retrieve data from the cache; making the flow of data through the network persistent by guarding against router failures and setting up reliable tunnels between routers; and, protecting the channel components against failure through replication.

A. Persistence through Caching

Timed Persistence (with time frame T) is the ability to retrieve the last time frame T of data from the publish-subscribe network. For example, if a subscriber leaves the network, any data on a persistent channel that is received during the subscriber's absence is held in the network for a time frame T (from the data's receipt). If the user returns within the time frame T, the user does not lose any data.

Figure 21A:
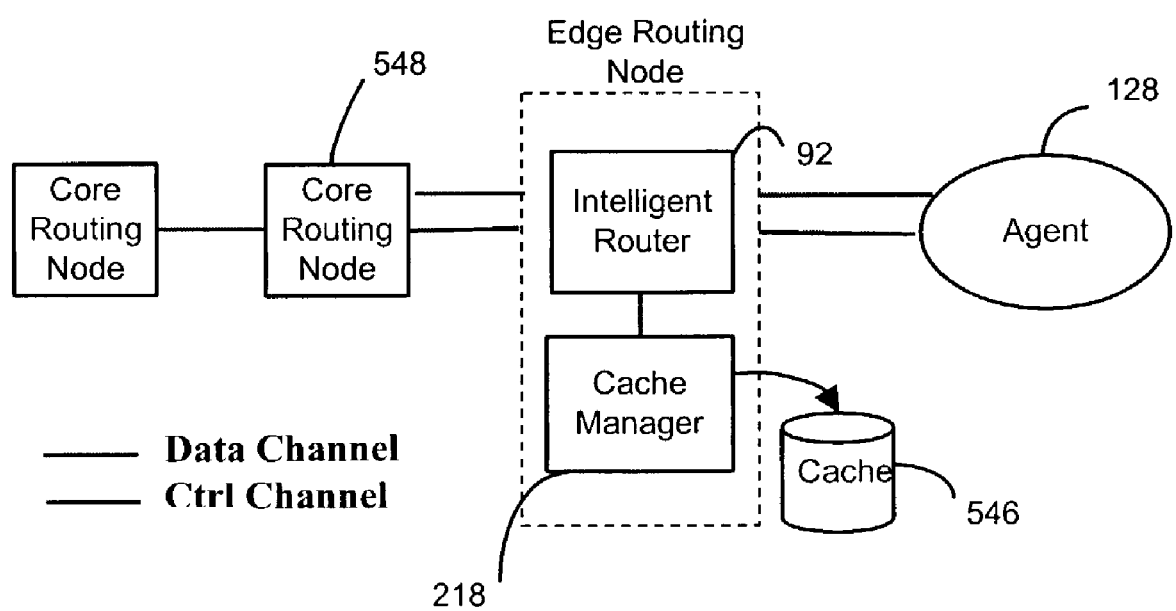
FIG. 21A is a block diagram illustrating components of a persistent publish-subscribe network.

FIG. 21A is a block diagram illustrating certain components of a publish-subscribe subscribe network that provide persistence through caching. As shown, the network includes core routing nodes and an edge routing node. Each routing node preferably includes an intelligent router 92 (shown with the edge routing node) and a conventional backbone router (not shown), as described above in FIG. 4. Each intelligent router 92 that needs to perform caching for persistent channels preferably has a cache manager 218 co-located with it, as illustrated by FIG. 21A. The cache manager 218 is described above with references to FIG. 8. The intelligent router 92 is preferably responsible for short-term persistence for retrieving lost data or recovering from router failures. The cache manager 218 is responsible for caching data to provide long-term persistence for a channel. The cache manager 218 preferably caches this data in the cache 540. The cache 540 preferably includes a memory and a disk (not shown). Also shown in FIG. 21A is an agent 128, which is preferably resident in subscriber machine 122 (not shown in FIG. 21A), as described above in FIG. 5. The agent 128 is responsible for communicating with the cache manager 218 to retrieve data from the cache 540, receiving the retrieved data and for organizing the retrieved data.

Although not shown in FIG. 21A, each of the first level of core routing nodes upstream from the edge routing node preferably includes a cache manager 218. Upstream is the direction moving away from the agent 128 (i.e., away from the subscriber machine 122). The first level of upstream core routing nodes refers to the routing nodes immediately upstream from the edge routing node. Although publish-subscribe networks often include a plurality of first level upstream core routing nodes, FIG. 21A only depicts one first level upstream core routing node, core routing node 548. As described above, a cache manager 218 provides for local caching of data at a network node at which it is located. Therefore, the operation of cache managers 218 located at various core routing nodes, including, e.g., core routing node 548, provides for distributed caching of data throughout the network core. This distributed caching provides a backup for the caching at edge routing node.

Figure 21B:
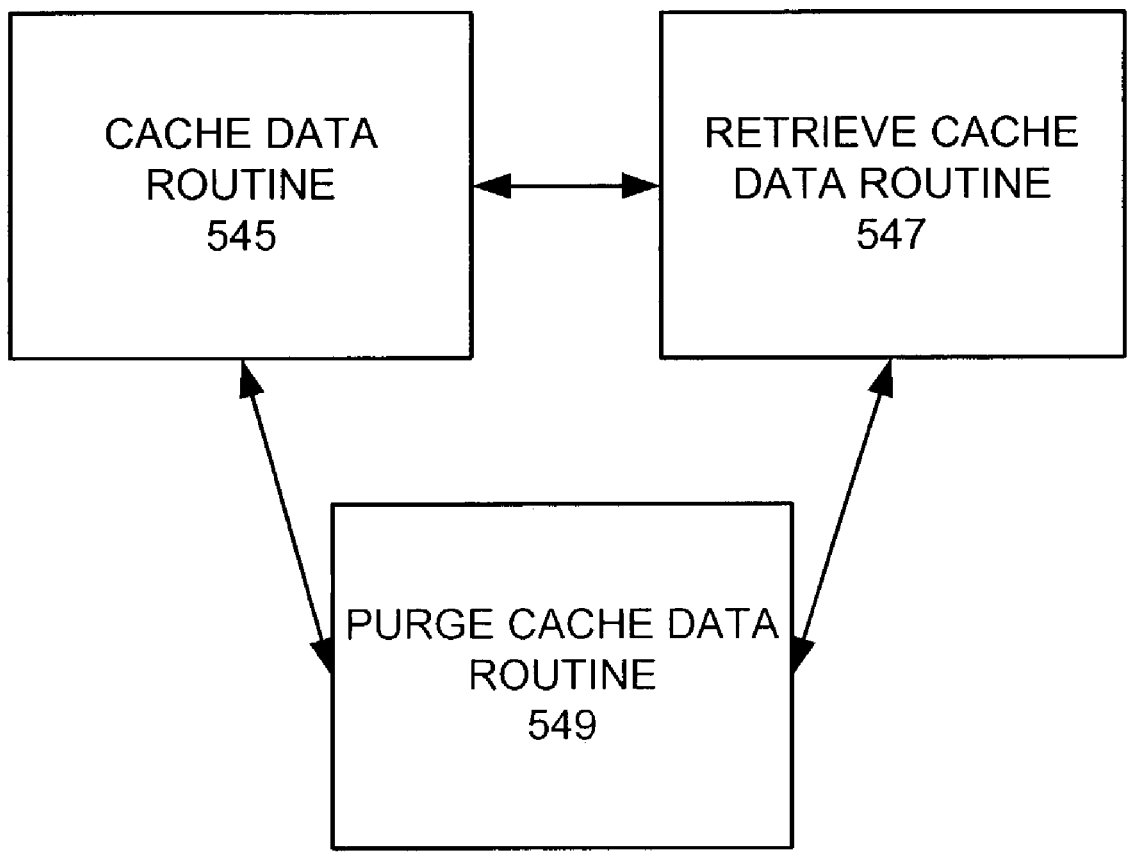
FIG. 21B is a diagram illustrating embodiments of cache manager routines.

Cache manager 218 preferably includes routines or subroutines responsible for managing the cache 546. These routines preferably include a caching data routine 545, purging cache data routine 547 and retrieving cache data routine 549, as illustrated in FIG. 21B. Each of these routines may operate separately or, as shown, may communicate and/or pass control between one another.

Figure 21C:
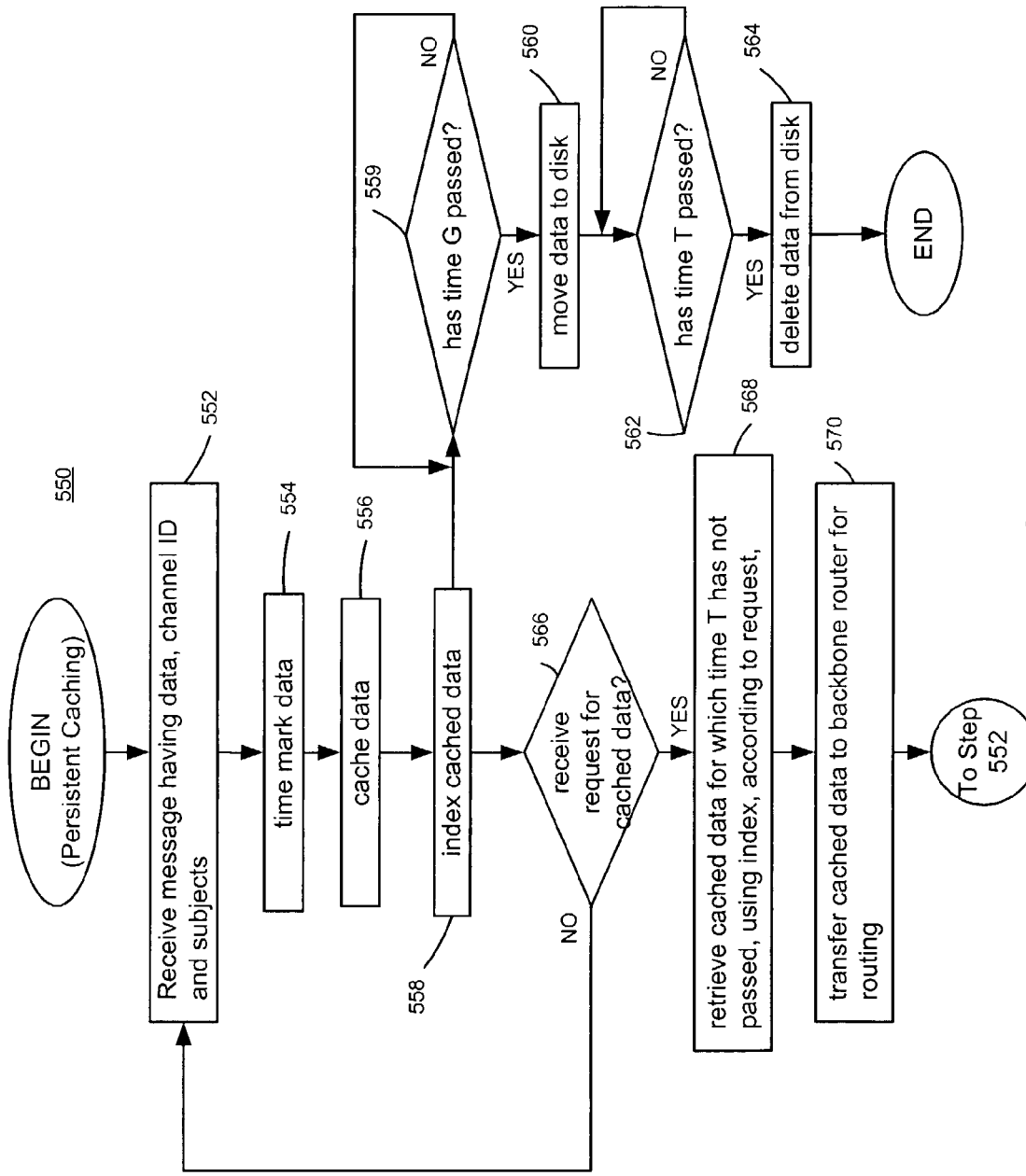
FIG. 21C is a flowchart of a persistent caching method.

FIG. 21C is a flow chart illustrating an example method of persistent caching 550 for data contained in a single message. As shown, the method 550 shows an exemplary execution of steps performed by each routine shown in FIG. 21B. In operation, these routines preferably operate independent of one another. Method 550 may be performed at an intelligent router 92, at an edge routing node or core routing nodes, that provides caching.

The method 550 can be implemented, for example, in software modules (e.g., cache manager 218) for execution by a processor 93 in intelligent router 92. Alternatively, it can be implemented in an ASIC or a combination of hardware and software, either in the same or different physical device as a corresponding intelligent router 92. The intelligent router 92 forwards messages that need to be cached to the cache manager 218. The cache manager 218 receives the messages containing data (step 552), time marks the data in the messages (step 554), and caches the data in the cache 546 (step 556) (analogous to steps 322-326 in FIG. 14 (see above)). The cache manager 218 indexes the cached data (step 558) in a number of ways, e.g., channel identifier, subjects, publisher identifier, timestamp etc, as described above. The indexing step 558 may take place prior to, simultaneously with, or after the caching step 556. The cached data may be indexed and stored in a hierarchical directory structure (e.g., see FIG. 15). See also Tables 17-19.

The data is cached in memory (the cache 546) and periodically moved to disk (step 560). A persistent time frame "T" for a particular channel is divided into N time grains each of size G. The caching in memory (step 556) is only for the duration of G. After the cache manager determines that time interval G has passed (step 559), the data is moved to the disk (step 560). The cache manager 218 stores the data on the disk for the duration of persistent timeout interval T.

The data corresponding to a time interval G is deleted from the disk (step 564) once the time becomes greater than the Persistent timeout (T) for the channel+the upper limit of the interval (step 562). To better understand this, suppose a channel has a T of 2 hours. As an example, the cache manager 218 uses a time granularity G of 15 minutes. For deleting the data from the disk, the policy preferably used is that when the last data cached during a time interval G (15 minutes) has been stored for T (2 hours), the entire data cached during that 15-minute interval will be discarded. Therefore, the data cached in the beginning of that 15-minute interval will have been stored for longer than 2 hours before it is deleted. In this example, the data cached during each 15-minute interval is a block of data. If the persistent time frame T is divided into N intervals, any point in time there will be N+1 blocks of data (N on disk and 1 in memory) in the cache 540 for each subject.

If the cache manager 218 receives a request for data (step 566), the cache manager 218 retrieves that requested cached data (for which time T has not passed), using the index (step 568) and transfers the retrieved data to the backbone router for routing to the requesting subscriber machine 122 (step 570). As described below, with reference to FIG. 21D, if the data is not at the cache 540 at the edge routing node, the cache manager 218 may invoke caches at the first level of upstream core routing nodes (e.g., at core routing node 548) to retrieve the data. If the cache manager 218 does not receive a request, method 550 loops back to step 552.

To guard against failures of the cache manager 218 at a given intelligent router 92, in addition to storing data in the cache 546, the data is also stored in caches at the first level of upstream core routing nodes (e.g., core routing node 548). Hence, steps 552-564 are preferably performed at the first level of upstream core routing nodes prior to the messages being routed to and method 550 being performed at the edge routing node.

The locations of the cache 546 (e.g., at the edge routing node) and the caches at the first level of upstream core routing nodes (e.g., at the first upstream core router 548) are stored locally in the agent 128. Therefore, if the subscriber machine 122 moves (e.g., the subscriber is a mobile subscriber that re-connects to the network at a different edge routing node), the agent 128 will provide the new edge routing node with the location of the caches for the edge routing node and first level of upstream core routing nodes to which the subscriber machine 122 was connected prior to moving. This enables persistence to be maintained even if the subscriber machine 122 moves.

Figure 21D:
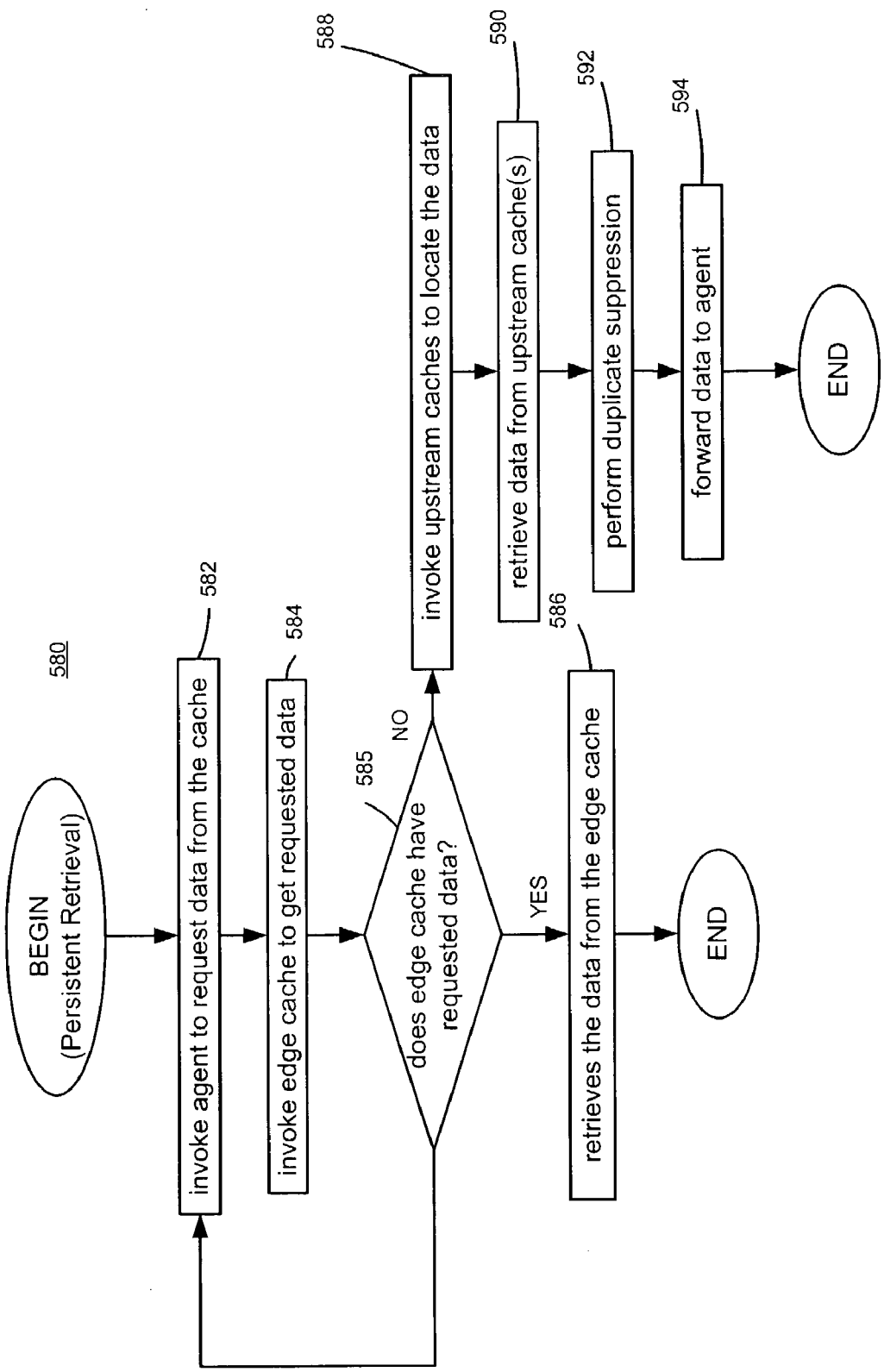
FIG. 21D is a flowchart of a persistent message retrieval method.

As seen in FIG. 21D, a flowchart of a method of persistent message retrieval 580, a user application 182 at subscriber machine 122 preferably invokes the agent 128 to request data from the cache (step 582). Using the stored cache locations, the agent 128 invokes the cache 546 at the appropriate edge routing node (e.g., using a getcache command) to get the data (step 584). The agent 128 may indicate what time frame of data to retrieve. Alternatively, the cache manager 218 may check the connection history of a subscriber machine 122 (see Table 18 above) to determine what cached data to retrieve. If the connection history indicates that the subscriber machine 122 was off-line for X period of time, the cache manager 218 may retrieve all available cached data for X. Additionally, the cache manager 218 may simply retrieve all data cached within persistent time frame T. If the edge routing node cache 546 has the data (step 585), the agent 128 retrieves the data from the cache 546 (step 586).

If the cache 546 does not have the data, the cache manager 218 uses a list of the caches at the first level of upstream routing nodes (e.g., core routing node 548) provided by the agent 128 to invoke these upstream caches to locate the data (step 588). Once the cache manager 218 locates the data in an upstream cache or caches, the cache manager 218 retrieves the data from the upstream cache(s) (step 590). The cache manager 218 may perform duplicate suppression (i.e., eliminate duplicate data) (step 592) before forwarding the data to the agent 128 (step 594).

B. Persistence through Failure Protection

An infrastructure consistent with the present embodiment has the following components or equivalent components: channel managers; event agent; and, routing nodes and caches. To guard against loss of messages during failure conditions, each of these components needs to be protected.

1. Channel Manager Fault Protection

Channel managers are described above with reference to FIG. 6. The channel managers are protected from failures through replication. The channel managers operate in a primary-backup group, where there is one primary module and the other backup modules. The primary module is responsible for all updates to the data and also responds to queries. The backup can only serve queries but cannot perform updates. It forwards all updates to the primary.

Components of the publish-subscribe network that need to retrieve channel information from the channel managers are referred to as channel manager clients and are assigned a channel manager. These clients include intelligent routers 92, and their cache managers 218, and subscriber machines 122, and their agents 128. If the channel manager assigned to the client fails, the client accesses another channel manager and connects to it.

2. Routers and Cache Fault Protection

There are several levels of recovery for the routing infrastructure components. (Level 0, Level 1, through Level 3). Level 0 controls the failure effect locally (i.e., within the failed router) and the recovery is also limited to the failed routing node. Level 0 recovery depends on hardware redundancy to recover from hardware failures. The hardware resources in a router are replicated. The main advantage of level 0 recovery is the short recovery time and transparency. Level 1 controls the failure effect within a LAN. Level 1 recovery may be implemented with IP fail-over using cluster technology. However, tunnels of a failed router to its neighbors have to be reconstructed after recovery. Therefore, level 1 recovery is less transparent and takes longer than level 0 recovery.

The scope of Level 2 recovery is to recover router failure by remote backup router over a WAN, without affecting network topology, which may cause complex reconfiguration and data loss. Level 2 may be implementing by grouping routers to form a recovery set (e.g., a primary and backup router). One router may be a primary in one group and a backup for another group. The primary exchanges routing and network configurations with the backup, and when the backup detects a failure of the primary, it takes over the functions of the primary. The backup ensures that the primary router failed, and not the link to the primary router, by ensuring that it can connect to the majority of neighbor primary routers of the failed primary router. If it cannot, level 3 recovery is triggered.

Level 3 on the other hand may involve a system-wide coordinated recovery. Level 3 is used when all else fails. The router that detects such a failure sends a restart notice to all downstream routers. The routers receiving the notice, suspend all other recovery, stop all network services, and discard all multicasting information in the restart message. After all network services have been terminated, the router restarts all services, including tree-building process for multicasting. Any failure in the network is treated by a lower level recovery procedure. If a lower level recovery cannot be applied, the recovery is escalated to the next higher level. If none of the lower level recoveries work, the level 3 recovery is used.

3. Reliable Tunnels

To guard against loss of messages during network failures, a reliable tunnel is used to carry traffic between routing nodes. Tunnels are described above in the description of FIG. 3. Any message losses during transmission are detected by the receiving end, which then asks the sender to retransmit the lost messages.

While the present invention has been described in connection with an exemplary embodiment, it will be understood that many modifications will be readily apparent to those skilled in the art, and this application is intended to cover any adaptations or variations thereof. For example, various types of publisher machines, user or subscriber machines, channels and configurations of them, and hardware and software implementations of the content-based routing and other functions may be used without departing from the scope of the invention. This invention should be limited only by the claims and equivalents thereof.

The invention claimed is:

1. A method for providing persistent caching of messages delivered via a publish-subscribe network, comprising the steps of:
    (a) receiving, at a first node, a message having data via the network;
    (b) time-marking the data;
    (c) caching the data in a cache memory at the first node;
    (d) routing the message to a second node using content-based routing;
    (e) repeating steps (a) through (d) at the second node, wherein the data is cached in a cache memory at the second node;
    (f) routing at least one of the messages from the second node to a subscriber machine using content-based routing;
    (g) the second node receiving a request for cached data from the subscriber machine;
    (h) determining a time-amount of cached data to retrieve in response to the request; and
    (i) retrieving the determined time-amount of cached data based on the time-mark of the cached data.

2. The method of claim 1, further comprising the steps of:
    determining if a time granularity G has passed since the caching step (c); and
    moving the cached data from the cache memory to a disk based on a determination that G has passed.

3. The method of claim 1, further comprising the steps of:
    determining if a persistent time-frame T has passed since the caching step (c) for a last block of the cached data; and
    deleting the cached data based on a determination that T has passed for the last block of the cached data.

4. The method of claim 3, wherein T is set based on a channel with which the data is associated.

5. The method of claim 1, wherein the first node comprises an intelligent router and the receiving step (a) receives the message at the intelligent router.

6. The method of claim 5, wherein the intelligent router includes a cache manager and the cache manager performs steps (b) and (c).

7. The method of claim 1, wherein the second node comprises a subscriber machine.

8. A router for providing persistent caching of messages delivered via a publish-subscribe network, comprising modules for executing the method of claim 1.

9. A publish-subscribe network for providing persistent caching of messages, comprising nodes that include modules for executing the method of claim 1.

10. A computer-readable medium comprising instructions for executing the method of claim 1.

11. A method for providing persistent caching of messages delivered via a publish-subscribe network, comprising the steps of:
    (a) receiving a plurality of messages having data via the network at a plurality of upstream nodes;

(b) time-marking the data;
(c) caching the data in cache memories at one or more of the plurality of upstream nodes;
(d) routing the messages to an edge node using content-based routing;
(e) repeating steps (a) through (c) at the edge node, wherein the data is cached in a cache memory at the edge node;
(f) routing at least one of the messages from the edge node to a subscriber machine using content-based routing;
(g) the edge node receiving a request for cached data from the subscriber machine;
(h) determining a time-amount of cached data to retrieve in response to the request; and
(i) retrieving the determined time-amount of cached data based on the time-mark of the cached data.

12. The method of claim 11, wherein the time-amount is determined from the request, wherein the request includes a requested time-amount of cached data to be retrieved.

13. The method of claim 11, wherein the time-amount is determined by calculating a disconnected time for the subscriber machine, wherein the disconnected time is the amount of time that the subscriber machine was disconnected from the publish-subscribe network.

14. The method of claim 11, further comprising the step of determining that at least some requested cached data is stored at one or more of the plurality of upstream nodes.

15. A method for providing persistent caching of messages delivered via a publish-subscribe network, comprising the steps of:

(a) receiving a plurality of messages having data via the network at a plurality of upstream nodes;
(b) time-marking the data;
(c) caching the data in cache memories at one or more of the plurality of upstream nodes;
(d) routing the messages to an edge node using content-based routing; and,
(e) repeating steps (a) through (c) at the edge node, wherein the data is cached in a cache memory at the edge node;
(f) determining that at least some requested cached data is stored at one or more of the plurality of upstream nodes; and
(g) the edge node receiving a list of upstream nodes from the subscriber machine.

16. The method of claim 14, further comprising the steps of:
communicating the request for cached data to one or more of the plurality of upstream nodes;
retrieving requested cached data from the one or more of the plurality of upstream nodes; and,
routing the retrieved data to the subscriber machine.

17. The method of claim 16, further comprising the step of performing duplicate suppression on the retrieved data.

18. A publish-subscribe network for providing persistent caching of messages, comprising a plurality of upstream nodes and an edge node, wherein the nodes include modules for executing the method of claim 11.

* * * * *